(12) United States Patent
Beshai et al.

(10) Patent No.: US 7,590,110 B2
(45) Date of Patent: Sep. 15, 2009

(54) BALANCED HIGH-CAPACITY SWITCH

(75) Inventors: Maged E. Beshai, Stittsville (CA);
Lindsay McGuinness, Concord, MA (US)

(73) Assignee: Nortel Networks Limited, St. Laurent, Quebec (CA)

(*) Notice: Subject to any disclaimer, the term of this patent is extended or adjusted under 35 U.S.C. 154(b) by 592 days.

(21) Appl. No.: 11/315,715

(22) Filed: Dec. 22, 2005

(65) Prior Publication Data

US 2007/0147362 A1   Jun. 28, 2007

(51) Int. Cl.
| | |
|---|---|
| H04L 12/50 | (2006.01) |
| H04Q 11/00 | (2006.01) |
| G01R 31/08 | (2006.01) |
| G08C 15/00 | (2006.01) |
| H04J 1/16 | (2006.01) |
| H04J 3/14 | (2006.01) |
| H04L 1/00 | (2006.01) |
| H04L 12/26 | (2006.01) |

(52) U.S. Cl. .................. 370/369; 370/370; 370/372; 370/373; 370/375; 370/376; 370/387; 370/388

(58) Field of Classification Search ................. None
See application file for complete search history.

(56) References Cited

U.S. PATENT DOCUMENTS 5,841,775 A * 11/1998 Huang .................. 370/422

OTHER PUBLICATIONS

Bhuyan, et al. (Bhuyan and Agrawal, "Generalized Hypercube and Hyperbus Structures for a Computer Network," Computers, IEEE Transactions on , vol. C-33, No. 4, pp. 323-333, Apr. 1984.*

Matsunaga, Sorting-based routing algorithms of a photonic ATM cell switch: HiPower, Communications, IEEE Transactions on , vol. 41, No. 9, pp. 1356-1363, Sep. 1993.*

Chang, Lee, and Jou, Load Balanced Birkhoff-von Neumann Switches, Elsevier Publications, Aug. 29, 2001.*

* cited by examiner

*Primary Examiner*—Daniel J Ryman
*Assistant Examiner*—Christopher Crutchfield
(74) *Attorney, Agent, or Firm*—Anderson Gorecki & Manaras LLP

(57) ABSTRACT

A high capacity switching node comprises a lattice structure of low-latency switch units and a plurality of balanced connectors interfacing electronic edge nodes to diagonal subsets of said switch units. The edge nodes may be collocated with the switch units or remotely located. The switch units may be bufferless, having optical switch-fabrics for example, thus requiring a compound vacancy-matching process. Using switch units each of dimension 64×64, a fast switching node having a dimension of the order of 10,000×10,000 can be constructed. With a typical wavelength-channel capacity of 10 Gb/s, the fast-switching node would scale to a capacity of 100 terabits per second, which is orders of magnitude higher than the capacity of known fast optical switches. A fast-switching optical switch of such scalability significantly reduces network complexity and cost.

17 Claims, 25 Drawing Sheets

BALANCED HIGH-CAPACITY SWITCH

FIELD OF THE INVENTION

The present invention relates to a high-capacity optical-core switch and its use in a wide-coverage network.

BACKGROUND

It is well known to use switch units as building blocks of higher capacity switches using cascaded multi-stage structures. If the switch units in a time-multiplexed multi-stage switch have buffers, a path through a multi-stage switch is established as a number of decoupled simple switching processes which greatly simplify connection setup in a multi-stage switch. With bufferless switch units, such as optical switch units, finding a path through a time-multiplexed multi-stage switch involves a processing-intensive connection setup.

A mesh structure of switch units, whether using buffered or bufferless switch units, may be preferable to an unfolded cascaded multi-stage structure because a proportion of connections may be routed through paths traversing fewer switch units in comparison with cascaded structures.

Fast optical switch units, suitable for use in a time-shared switching node, are limited to small dimensions; e.g., 64×64. A first-order mesh of 64×64 switch units can produce a switch of approximately 1000 dual input/output ports. A second order mesh using switch units each of dimension 64×64 can produce a switch of more than 10000 dual ports. However, connectivity for a second-order mesh of bufferless switch units employed in a fast-switching time-shared network is generally determined using a fourth-order time-slot-matching process for a significant proportion of connections. This complicates the scheduling process and may lead to low utilization of the switch fabric.

Future networks are likely to use fast optical switches in the core, and core switches are required to be of large dimension in order to reduce the mean number of hops and, hence, improve network performance and reduce cost.

SUMMARY

It is therefore an object of the present invention to provide a bufferless time-shared switch of large dimension using switch units of constrained dimension. The proposed switch comprises balanced connectors each connecting to a selected subset of input ports of a meshed switch fabric so that each external source accesses the fabric from successive input ports. With an appropriate scheduling process, lower-order matching processes may be used. In an alternative implementation, the balanced connectors may be placed at the output side, each connecting to a selected subset of the output ports. The switch units may be electronic, photonic, or a combination of electronic and photonic modules.

According to one aspect, the present invention provides a switch comprising: a plurality of switch units arranged in a lattice structure of row arrays of switch units and column arrays of switch units wherein switch units of each row array are interconnected to form a full mesh and switch units of each said column array are interconnected to form a full mesh; and a plurality of balanced connectors each balanced connector connecting to a diagonal subset of said switch units. The switch further comprises a plurality of array controllers and a master controller coupled to each of the array controllers. An array controller is associated with a row array of switch units and is coupled to a slave controller of each switch unit in the row array;

According to another aspect, the present invention provides an asymmetrical switch comprising: a plurality of input ports; and a plurality of connectors each connector for cyclically connecting a subset of ingress channels from among a plurality of ingress channels to a subset of input ports from among the plurality of input ports during successive time intervals of a time frame. The asymmetrical switch further includes a plurality of output ports and a switching fabric for connecting each of the input ports to any output port. The connectors are preferably balanced connectors. A balanced connector equitably connects each ingress channel of a subset of ingress channels to each input port of a subset of input ports during the time frame. The switching fabric may comprise a plurality of switch units arranged in row arrays of switch units interconnected to form a full mesh and column arrays of switch units interconnected to form a full mesh.

According to a further aspect, the present invention provides an asymmetrical switch comprising a plurality of output ports and a plurality of connectors each connector for cyclically connecting a subset of output ports from among the plurality of output ports to egress channels from among a plurality of egress channels during successive time intervals of a time frame. The asymmetrical switch further includes a plurality of input ports and a switching fabric for connecting any of the input ports to any of the output ports. The connectors are preferably balanced connectors where a balanced connector equitably connects each output port of a subset of output ports to each egress channel of a subset of egress channels during the time frame.

According to another aspect, the invention provides a control system in a lattice structure of bufferless switch units.

According to another aspect, the present invention provides a method of switching signals from a plurality of input channels through a switch that comprises a plurality of input ports and a plurality of output ports. The method comprising steps of: each input channel cyclically accessing each input port in a subset of the input ports; and routing each signal carried by the each input channel from at least one input port of the subset of input ports along at least one path within the switch to at least one output port in the plurality of output ports.

According to a further aspect, the invention provides a method of switching signals from an incoming channel in a plurality of incoming channels to selected output ports of selected switch units from among a plurality of switch units interconnected in a mesh structure. According to the method, each incoming channel cyclically accesses designated switch units from among the plurality of switch units during successive time intervals and during each time interval performs temporal matching processes along favorable paths from a designated switch unit to the selected output ports of the selected switch units.

BRIEF DESCRIPTION OF THE DRAWINGS

Embodiments of the present invention will be further described with reference to the accompanying exemplary drawings, in which.

TERMINOLOGY

Figure 1:
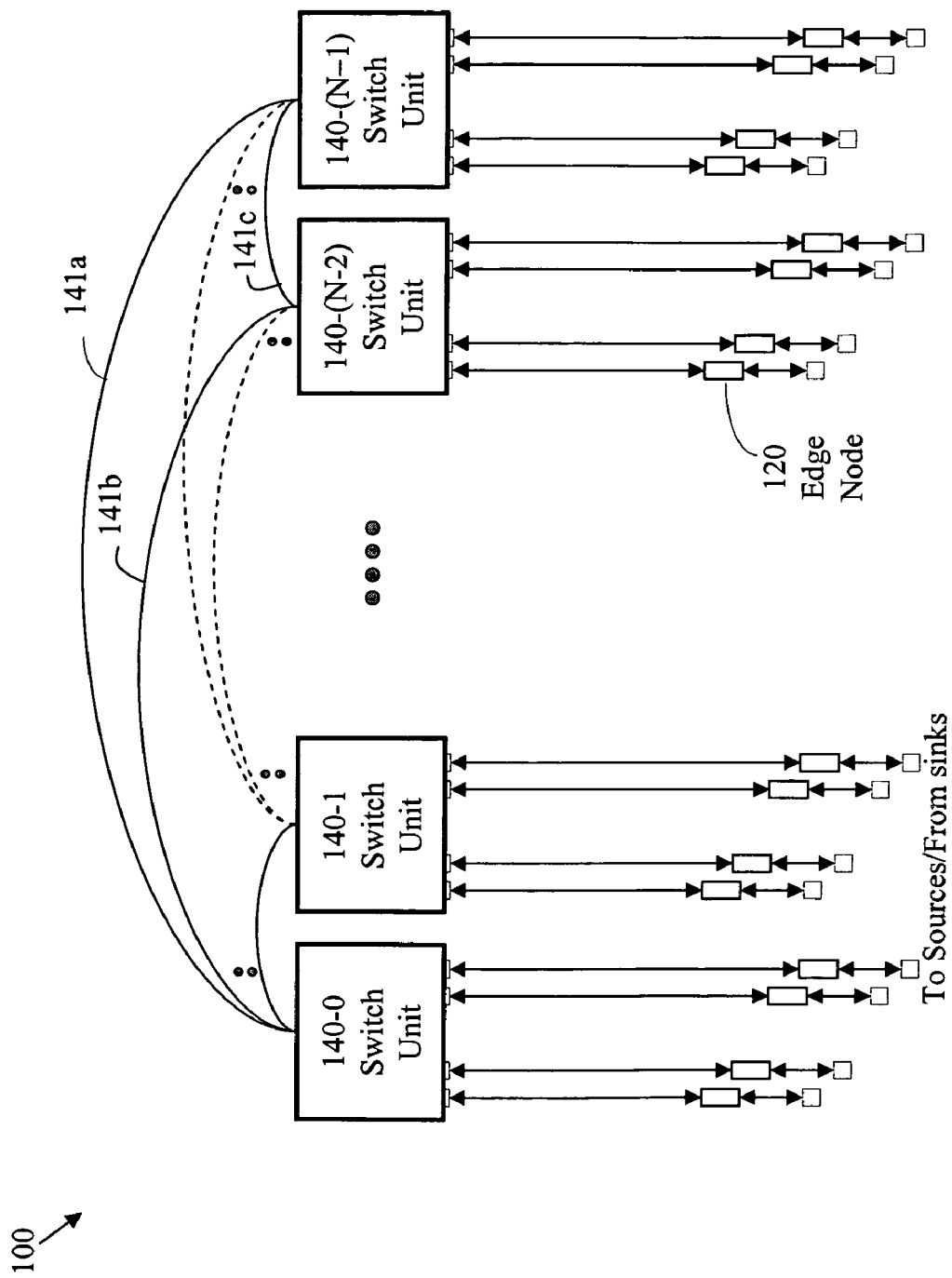
FIG. 1 illustrates a prior-art switch comprising switch units interconnected in a first-order mesh structure each switch unit supporting a number of edge nodes.

The terminology used in describing the embodiments of the invention is listed below.

Edge node: A switching node having subtending information sources and sinks and connecting to other nodes is called an edge node. An edge node has two components: a source node and a sink node. An edge node is preferably an electronic node.

Source node: An edge-node component transmitting signals received from information sources to other nodes is called a source node.

Sink node: An edge node component receiving signals from other nodes and delivering the received signals to information sinks is called a sink node.

Core node: A switching node that connects to Edge nodes or other Core nodes;

Inbound port: An input port of an edge node receiving signals from external nodes is referenced as an inbound port. An inbound port receives signals over "inbound channels".

Outbound port: An output port of an edge node transmitting signals to external nodes is referenced as an outbound port. An outbound port transmits signals over "outbound channels".

Inlet port: An input port of a core node connecting to an outbound channel from an outbound port of an edge node is herein called an inlet port.

Outlet port: An output port of a core node transmitting signals directed to an inbound port of an edge node is herein called an outlet port. The edge node receives the signals through inbound channels.

Inward port: An input port of a core node, receiving a channel from another core node, is called an inward port.

Outward port: An output port of a core node, having a channel to another core node, is called an outward port.

Balanced connector: It is a connector having several input ports and several output ports with each input port connecting to each output port in a predetermined temporal order. The balanced connector is, therefore, a time-division-multiplexed device.

Rotator unit: A balanced connector of large dimension, having a prescribed number of input ports and output ports, may comprise several rotator units of smaller dimension, each having fewer input ports (and fewer output ports) than the prescribed number of input ports (and output ports). A balanced connector may, however, be implemented as a single rotator.

Rotation cycle: A rotation cycle is a sequence of input to output connections after which a rotator unit returns to the same connection configuration and begins an identical subsequent sequence. If a rotator comprises multiple rotator units, each rotator unit returns to the same connection configuration after each rotation cycle.

Time frame: The time domain may be divided into successive time periods of equal durations to facilitate event scheduling in a switching node. Herein, a time frame equals the duration of a rotation cycle.

Time slot: The time frame is divided into a predetermined number of time slots with each time slot equal to the time allocated to switch a signal unit (data unit) across an edge node or across a switch unit in the core.

Allocable time slot: An allocable time slot is a time slot during which all ports or links traversed by a designated path are free.

Time interval: Herein, a time interval is the time duration allocated to each connection configuration of a balanced connector or a rotator unit. A time interval may contain several time slots.

Rotation shift: A rotation shift of a rotator unit, where the output ports are given sequential numbers, is defined as the difference between the sequential numbers of output ports accessed by an input port of the rotator unit during successive time intervals. The difference between successive output ports may also be viewed as a spatial separation of output ports.

Time Locking: Time-locking is a process of time coordination to enable time alignment of signals received at a connecting node. In one realization, a first controller is time-locked to a second controller so that a signal transmitted at an instant of time indicated by a time counter at the first controller arrives at the second controller at the same instant of time as indicated by an identical time counter at the second controller.

First-order matching process: In a first-order matching process, a connection requesting a single time slot or multiple time slots requires each time slot to be free in two corresponding ports.

Compound matching process: In a compound second-order matching process, a connection specifying a single time slot or multiple time slots requires that each time slot be free in three corresponding ports (i.e., traversing two switch units). In a compound third-order matching process, a connection specifying a single time slot or multiple time slots requires that each time slot be free in four corresponding ports (i.e., traversing three switch units).

Control domain: A controller of the core switch may receive control signals from a first set of edge nodes and send signals to a second set of edge nodes. The first set and second set constitute the control domain of the controller.

Incoming channel: The term refers to a channel from an edge node, whether collocated with the switch or remote, to an input port of a balanced connector or to an input port of a switch unit. An incoming channel is also referenced as an "ingress channel".

Outgoing channel: The term refers to a channel from a switch unit, or from a balanced connector, to an edge node. An outgoing channel is also referenced as an "egress channel".

Source switch unit: In a connection set-up, a source switch unit is a switch unit permanently connected to the traffic source of the connection.

Sink switch unit: In a connection set-up, a sink switch unit is a switch unit permanently connected to the traffic sink of the connection.

First-order mesh: A switch structure comprising several switch units where each switch unit has a direct link to each other switch unit, resulting in full connectivity, is referenced as a first-order mesh.

Higher-order mesh: A switch structure comprising several switch units where each switch unit has direct links to only a subset of the switch units, resulting in partial connectivity, is referenced as a higher-order mesh.

DETAILED DESCRIPTION

First-Order Mesh Structure

FIG. 1 illustrates a prior-art switch 100 comprising switch units 140 arranged in a first-order mesh structure. The mesh structure 100 comprises switch units 140 each connecting to edge nodes 120 and to other switch units 140. The mesh architecture has several advantages over an unfolded multi-stage structures, the advantages including higher efficiency and reduced processing effort as described in Applicant's U.S. patent application Ser. No. 10/223,222 filed on Aug. 20, 2002 and titled "Modular high-capacity switch", the specification of which is incorporated herein by reference. Hereinafter, the term edge node will be used to refer to an integrated source node and sink node in either a centralized switch where edge buffers are collocated with the switch units, or a distributed switch where edge nodes are separated by a significant distance from the switch. (Where distinction between a source node and its associated sink node is not required, the edge node and each of its two components are likewise referenced.)

A distributed bufferless switch, employing bufferless switch units, involves time-coordination of the edge nodes and the bufferless switch to allow data to flow from source node to sink node in a controllable manner. It is important to note that even though the switch fabric may be bufferless, a controller of the switch may use buffers to facilitate scheduling and time coordination with other remote switches. Thus, an optical switch directly switches modulated optical carrier signals but demodulates control portions of the modulated optical carrier signals to extract control information for processing in the electronic domain. Notably, the volume of control signals would be orders of magnitude smaller than the volume of the payload signals. One form of time coordination is a time-locking process as defined above. The edge nodes may be divided into edge groups each subtending to one of the switch units 140 in the arrangement of FIG. 1. An edge group includes a source group of several source nodes and a sink group of several sink nodes.

A path from a switch unit such as switch unit 140-0 to another switch unit such as switch unit 140-(N−1) may be established over a direct channel 141a or through two cascaded channels such as channels 141b and 141c. With the absence of buffers within the switch units, establishing a path along two cascaded channels uses a third-order temporal matching process to allocate communication channels. The use of a balanced connector, as will be described below, significantly reduces the need for using cascaded channels.

Balanced First-Order Mesh Structure

Figure 2:
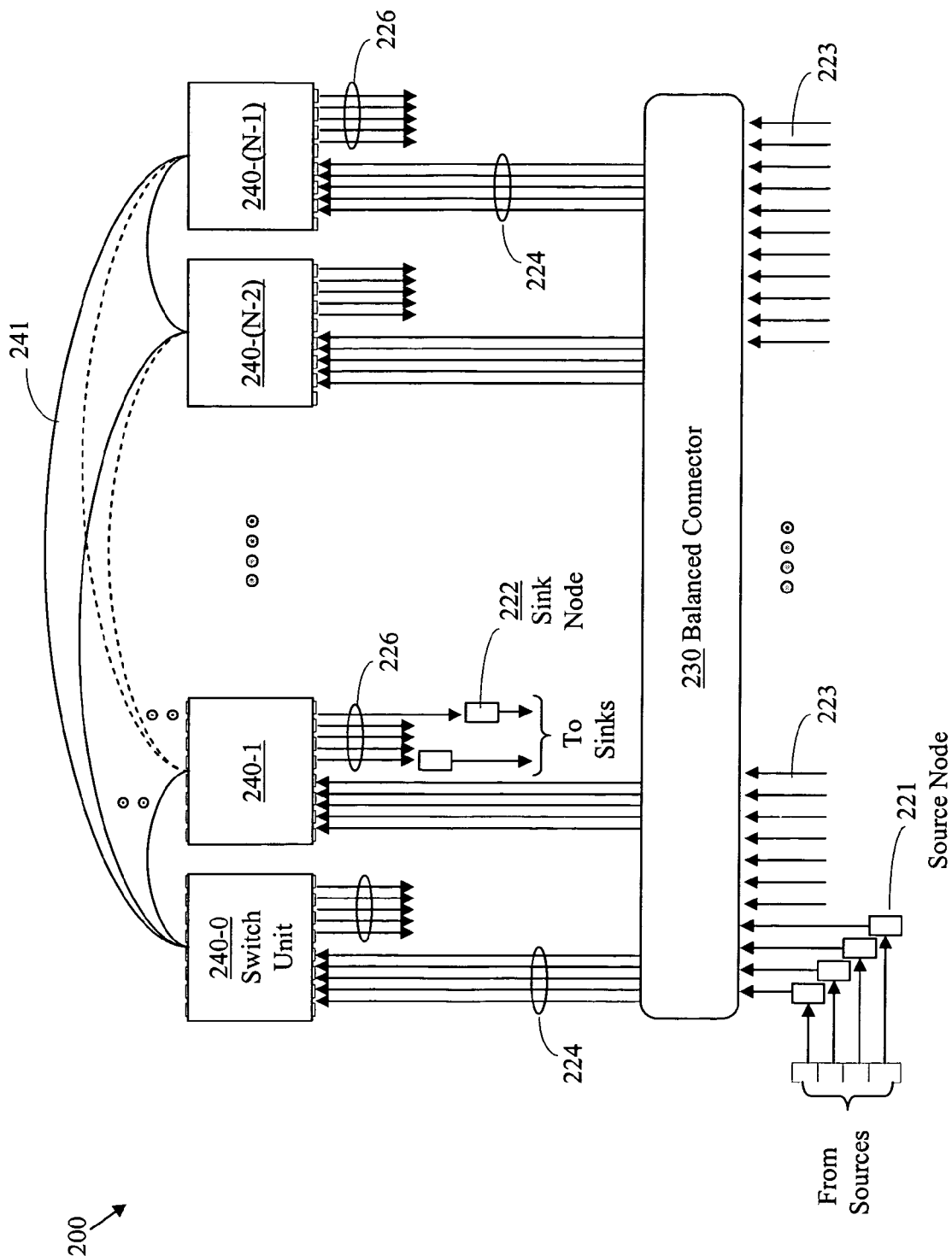
FIG. 2 illustrates a switch comprising switch units interconnected in a first-order mesh structure where the output ports of the switch units connect directly to edge nodes and the input ports of the switch units receive signals from the edge nodes through a balanced connector according to an embodiment of the present invention.

To equalize the load on the inner channels 141 that directly interconnect switch units 140, the traffic generated by each source node may be offered equitably to the switch units 140 as in switch 200 of FIG. 2. The switch fabric illustrated in FIG. 2 comprises N>1 switch units 240. A temporal cyclic balanced connector 230 interposed between the source nodes 221 and switch units 240 can realize traffic balancing. The balanced connector 230 is coupled to and may be collocated with the switch units 240 and may access some or all of the switch units of the modular switch fabric through channels 224. In the examples illustrated in this disclosure, the balanced connector 230 is connected to all switch units 240. An edge node comprises a source node 221 component and a sink node 222 component. Balanced connector 230 connects source nodes 221 to switch units 240 according to a fixed predefined cyclic connectivity pattern. Outbound channels from source nodes 221 carry traffic to the balanced connector 230 and switch units 240 sends traffic destined to sink nodes 222 directly through channels 226 (which are the inbound channels of the sink nodes). The source nodes 221 are arranged in source groups and the sink nodes 222 are likewise arranged in sink groups. Each source group paired with a sink group forms an edge-node group. Switch 200 is therefore an asymmetrical switch in the sense that it provides rotating access of incoming channels (ingress channels) 223 to the switch units 240 but fixed access of the outgoing channels (egress channels) 226 to the switch units 240.

Figure 3:
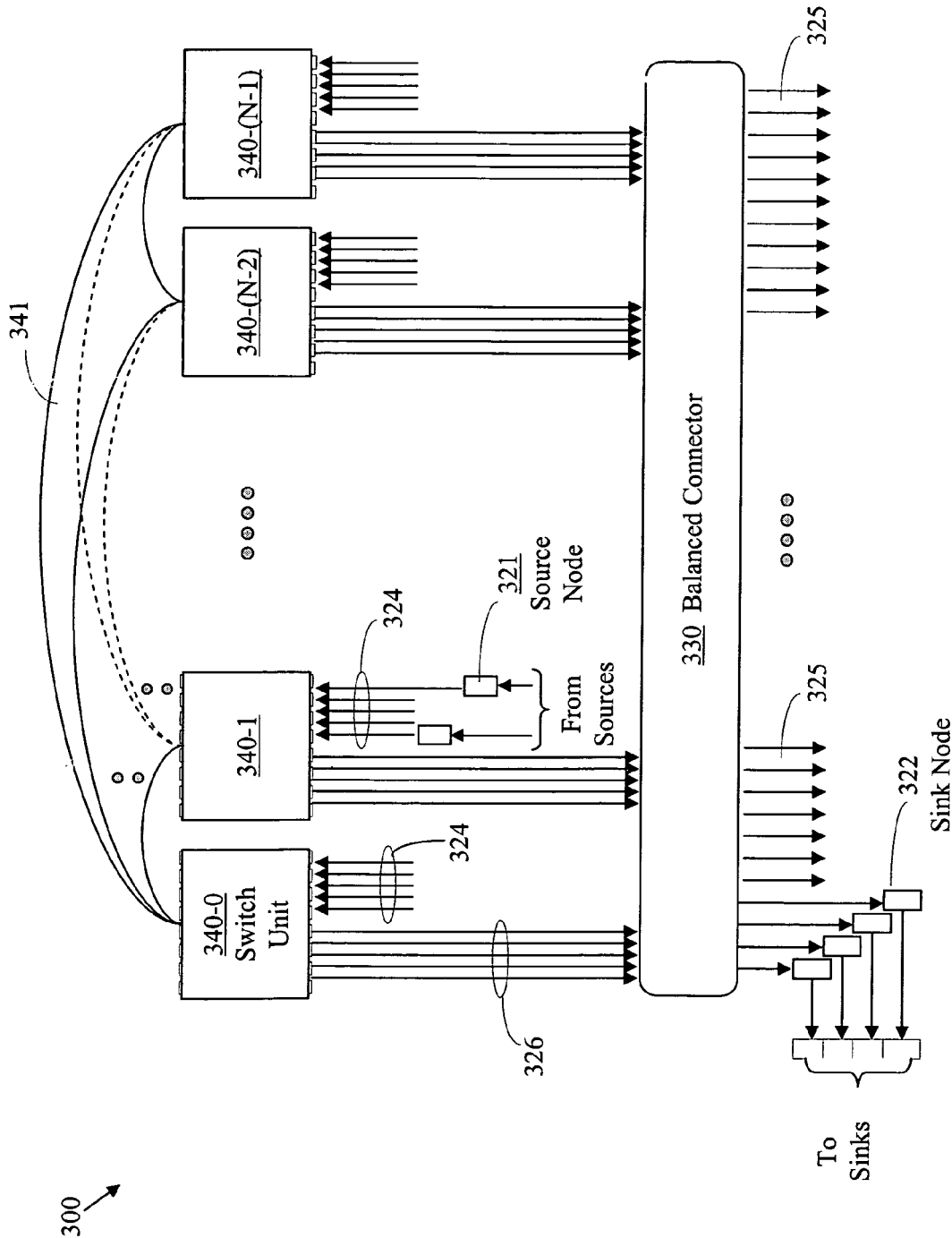
FIG. 3 illustrates a switch comprising switch units interconnected in a first-order mesh structure where the input ports of the switch units connect directly to edge nodes and the output ports of the switch units transmit signals to the edge nodes through a balanced connector according to an embodiment of the present invention.

FIG. 3 illustrates a switch 300 comprising switch units 340 interconnected in a first-order mesh structure where the input ports of the switch units 340 connect directly to edge nodes (source nodes 321) and the output ports of the switch units 340 transmit signals to the edge nodes (sink nodes 322) through a balanced connector 330. In the switch 200 of FIG. 2, each outgoing channel (egress channel) to an edge node has a fixed affiliation with a switch unit 240 and each incoming channel (ingress channel) from an edge node has rotating access to the switch units 240 so that the signal transmitted by the edge node during successive time intervals is offered to successive switch units 240. In the switch of FIG. 3, each incoming channel (ingress channel) from an edge node has a fixed affiliation with a switch unit 340 while each outgoing channel (egress channel) to an edge node has a rotating access to switch units 340 so that signals received at the edge node during successive time intervals are transmitted from successive switch units 340. Switch 300 is therefore an asymmetrical switch in the sense that it provides rotating access of outgoing channels (egress channels) 326 to the switch units 340 but fixed access of the incoming channels (ingress channels) 324 to the switch units 340.

The two conjugate configurations of FIG. 2 and FIG. 3 are functionally similar and the selection of either may be motivated by factors such as the physical layout.

Balanced Connector

Figure 4:
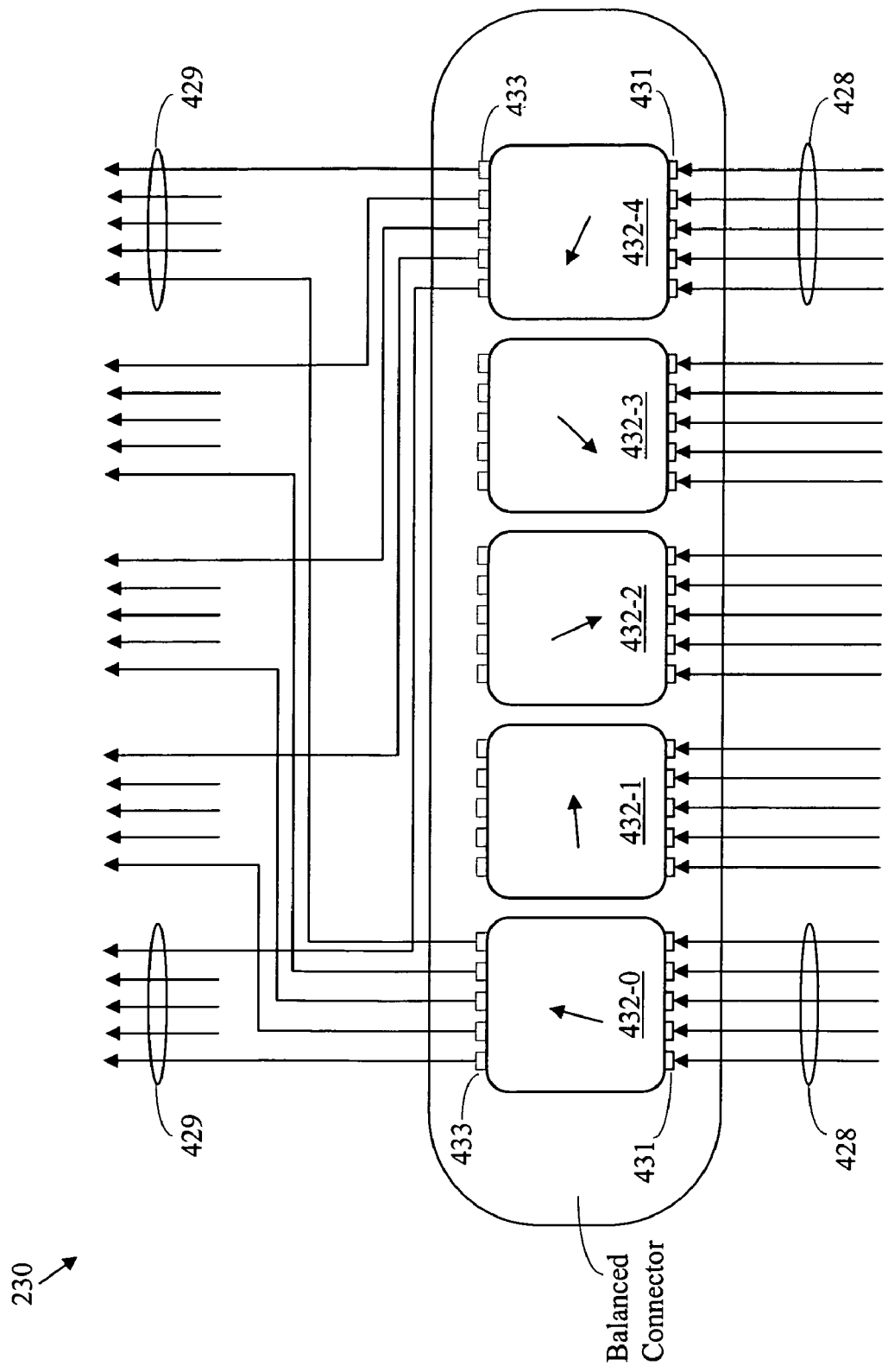
FIG. 4 illustrates a balanced connector comprising a plurality of rotator units operating at the same rotation speed but having different rotation order.

The balanced connector couples different source nodes (or sink nodes) to a switch unit during successive time intervals of a rotation cycle. A rotation cycle includes a predetermined number of time-intervals. A time frame, corresponding to one or more complete rotation cycles, is defined by a predetermined number of rotation time intervals. For the purposes of this disclosure, a time frame is equal to one rotation cycle. Each rotation time interval may be divided into a number $\chi \geq 1$ of time slots to realize fine switching granularity. The number of time slots per time frame is therefore equal to the number of time intervals of a rotation cycle times the number of time slots per time interval. It is noted here that the balanced connector 230 changes its connectivity pattern every time interval while a switch unit 240 may change its connectivity pattern every time slot, which is a fraction of a time interval. FIG. 4 illustrates a balanced connector 230 (FIG. 2). The balanced connector comprises an array of rotator units 432 each having a plurality of input ports 431 and a plurality of output ports 433. The input ports 431 of a rotator unit 432 connect to a group 428 of incoming channels (ingress channels). Each output port 433 of a rotator unit 432 connects to a selected group 429 of internal channels leading to switch units 240. The output ports 433 of a rotator unit 432 may be given sequential numbers and a rotation shift of a rotator unit 432 is defined as the difference between the sequential numbers of output ports 433 accessed by an input port 431 of the rotator unit during successive time intervals. The difference between sequential numbers of successive output ports may also be viewed as a spatial separation of output ports 433. The rotator units 432 preferably have graduated rotation shifts, so that the rotation shift of each rotator unit (432-1 to 432-4) is larger than the rotation shift of a preceding rotator unit.

Spatial traffic imbalance in the modular switch 200 can be significantly reduced by ensuring that any two source nodes 221 do not access the same switch unit 240 during a large portion of a complete rotation cycle. Each input port 431 of the balanced connector 230 receives a channel from a source node. The output ports 433 of the balanced connector are divided into output groups with the output ports 433 of each output group connecting to different switch units 240. Traffic is forwarded through the balanced connector such that the below three conditions are satisfied:

(1) during any two successive time intervals, each input port 431 of the balanced connector connects to different internal-channel groups 429 (hence different switch units 240), (2) during a time frame, each input port 431 connects to an internal channel in each internal-channel group 429, and (3) during a time frame, any combination of two input ports 431 connects only once to output ports leading to the same internal-channel group 429.

A rotator unit 432 preferably has a prime number of output ports 433. The modular structure of FIG. 4 enables the construction of a balanced connector of large dimension (exceeding 1000×1000 for example), with an array of rotator units 432 of smaller dimension (each of dimension 61×61 for example), where the rotator units 432 have graduated rotation shifts. The number of rotator units 432 is preferably less than or equal to the number J of output ports per rotator unit. Indexing the rotator units 432, in any arbitrary order, as 0 to (J−1), the $j^{th}$ rotator unit (432-$j$) has a rotation shift of j, $0 \leq j < J$. Thus, in a rotator unit 432-$j$ having M input ports and M output ports, an input port connects to output ports k, $(k+j)_{mod\ M}$, $(k+2j)_{mod\ M}$, etc., where k is an identifier of an output-port accessed by a given input port at a reference time interval (time-interval zero, for example) of a rotation cycle. For example, if M=7, j=4, an input port labeled 2 connects to output ports 2, $(2+4)_{mod\ 7}$, $(2+8)_{mod\ 7}$, $(2+12)_{mod\ 7}$, $(2+16)_{mod\ 7}$, $(2+20)_{mod\ 7}$, $(2+24)_{mod\ 7}$, $(2+28)_{mod\ 7}$, i.e., 2, 6, 3, 0, 4, 1, 5, 2, etc., during a time frame of seven time intervals. Thus, the input port connects to all the output ports labeled 0 to 6 during each rotation cycle.

A rotator unit 432 has a rotator fabric and a connectivity controller (not illustrated) which controls the input-output connectivity pattern of the rotator fabric. The connectivity pattern indicates the output port 433 to which each input port 431 connects during successive time intervals in a rotation cycle. In accordance with the present invention, an input port 431 of the balanced connector may connect to successive output ports 433 during successive time intervals or may connect to output ports selected in any predetermined order. The successive output ports may be determined according to a rotation shift where the output ports are assigned sequential numbers, preferably starting with zero, and each input port connects to output ports selected so as to balance the loads of the switch units 240. In general, the connectivity pattern may be programmable.

Control of a First-Order Mesh Structure

Figure 5:
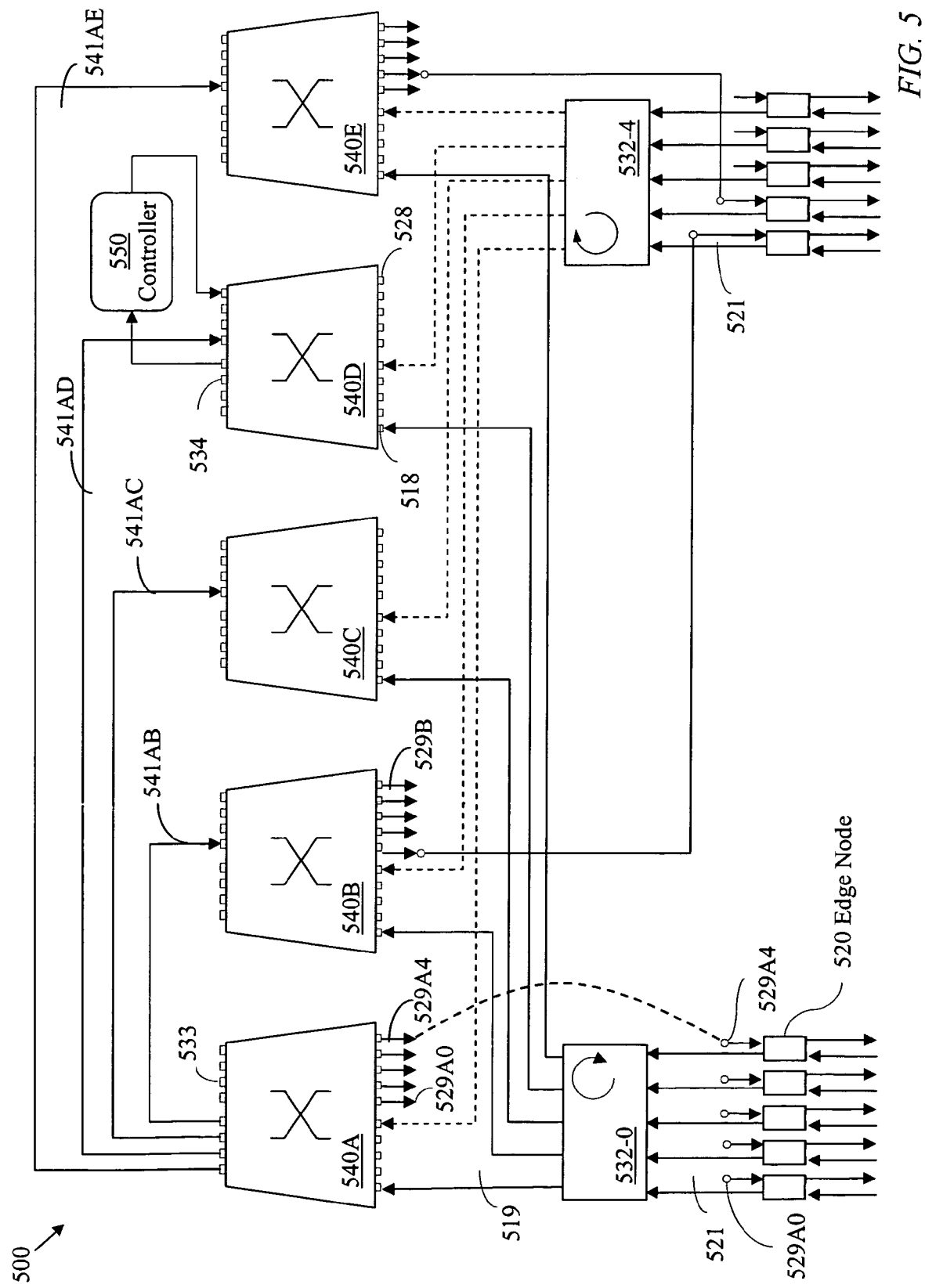
FIG. 5 further illustrates a switch comprising switch units interconnected in a first-order mesh and using a modular balanced connector.

FIG. 5 illustrates a switch 500 comprising a balanced bufferless switch core having bufferless switch units 540A, 540B, 540C, 540D, and 540E, referenced individually or collectively as 540, and edge nodes 520 arranged in groups, with each group of edge nodes connecting to a rotator unit 532 in the upstream direction and to a switch unit 540 in the downstream direction, thus resulting in an asymmetrical switching system. Each rotator unit 532 has a channel 519 to each switch unit 540. The switch units 540 are interconnected by channels 541. Channel 541AB connects an outward port 534 of switch unit 540A to an inward port 533 of switch unit 540B. Likewise, channels 541AC, 541AD, and 541AE connect switch unit 540A to switch units 540C, 540D, and 540E, respectively. A switch controller 550 is connected between an outward port 534 and an inward port 533 of a switch unit 540D. A switch unit 540 connects to external nodes through inlet ports 518 and outlet ports 528 and connects to other switch units 540 through outward ports 534 and inward ports 533. Controller 550 receives control signals from edge nodes during staggered time intervals and communicates control signals to the edge nodes during staggered time intervals. Control signals are switched in the switch unit 540D to and from the controller 550. Edge nodes 520 have asymmetrical connections to switch units 540. Each edge node 520 has a source node and a sink node. The source nodes and sink nodes are not illustrated separately in FIG. 5. The source node of each edge node 520 has an outbound channel 521 to an input port of a rotator unit 532 and the sink node of each edge node 520 has an inbound channel 529 from an outlet port 528 of a switch unit 540. For example, edge nodes 520 associated with rotator unit 532-0 has five inbound channels 529A0 to 529A4 directly received from switch unit 540A; to simplify the figure, only inbound channel 529A4 is explicitly illustrated. Thus, a source node of an edge node 520 may transmit to all switch units 540 while a sink node of an edge node 520 may receive only from one switch unit 540.

The switch 500 of FIG. 5 has a first-order mesh structure, where each switch unit has a channel to each other switch unit. The switch units 540 in this example are identical and the total number of switch units is, therefore, limited by the dimension of each switch unit. To increase the dimension of the entire switch, given the dimension limitation of the switch units, a higher-order mesh structure may be sought.

Second-Order Mesh Structure

Figure 6:
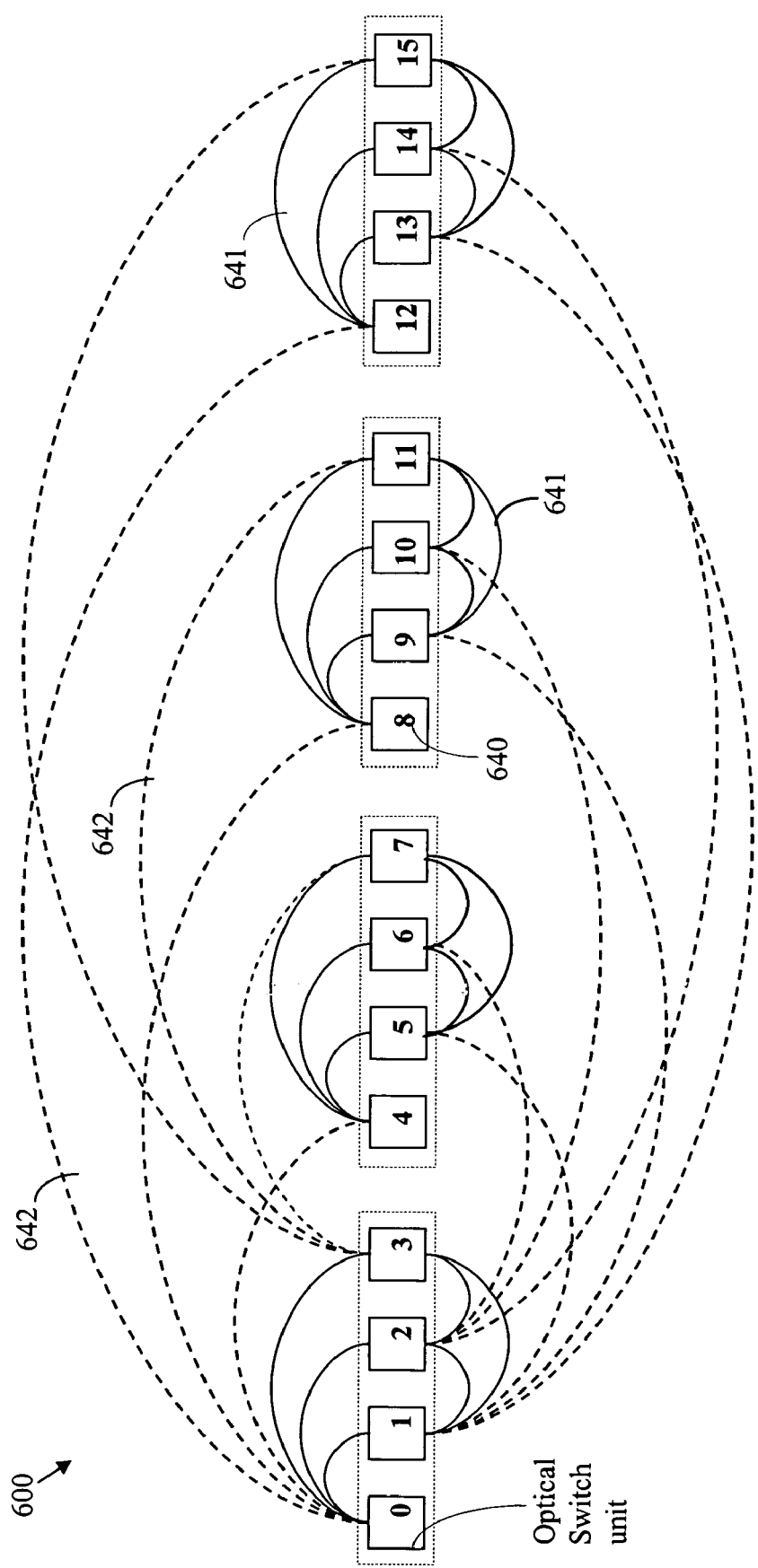
FIG. 6 illustrates a switch comprising switch units interconnected in a second-order mesh structure according to an embodiment of the present invention.

FIG. 6 illustrates a switch 600 comprising switch units 640 arranged in a second-order mesh. The switch units 640 are divided into groups of switch units and the switch units of each group are fully interconnected through links 641 to form a first-order mesh structure. Each switch unit 640 in each group has at least one channel 642 to at least one switch unit in each other switch-unit group. In such a structure, a path from a switch unit to another within the same group traverses at most one intermediate switch unit; an intermediate switch unit being any switch unit excluding the source switch unit and the sink switch unit. A path from a switch unit from one group to a switch unit in another group traverses at most two intermediate switch units. In a time-sharing system, such as the conventional time-division-multiplexing (TDM) scheme, traversing a number k of bufferless switch units (such as photonic switch units), including the originating and terminating switch units, involves a $k^{th}$-order temporal matching process. Thus, a path from an edge node to another edge node sharing the same switch unit is determined using a first-order matching process. A direct path from a first edge node connecting to a first switch unit to a second edge node connected to a second switch unit is determined using a second-order matching process, and a path traversing only one intermediate switch unit is determined using a third-order matching process. A third-order matching process can be computationally intensive and its use is preferably minimized. The complexity of a matching process increases rapidly as the matching order increases, as described in U.S. patent application Ser. No. 10/223,222 filed on Aug. 20, 2002 and titled "Modular high-capacity switch", the specification of which is incorporated herein by reference.

Figure 7:
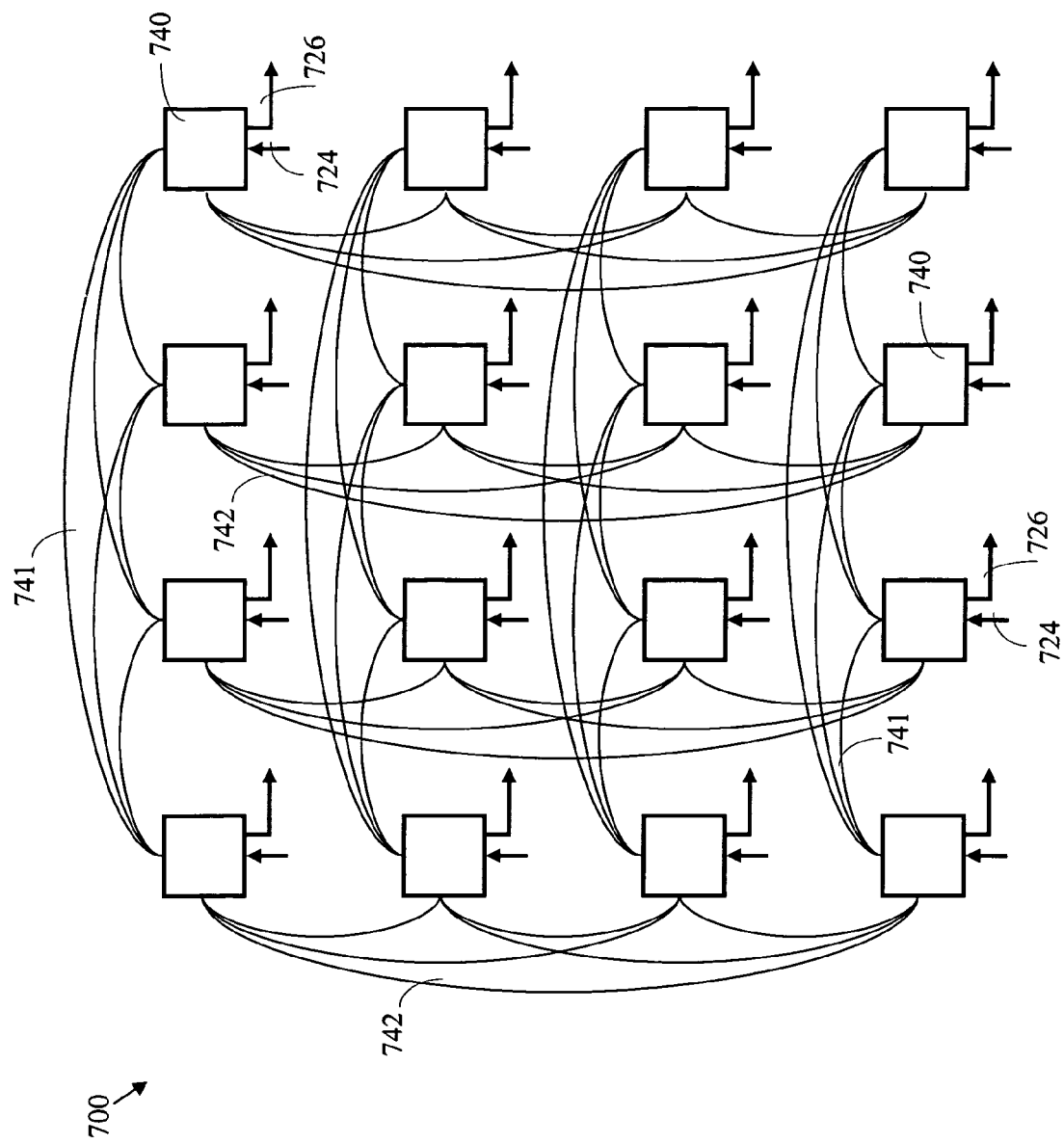
FIG. 7 illustrates a lattice representation of the switch of FIG. 6.
Figure 8:
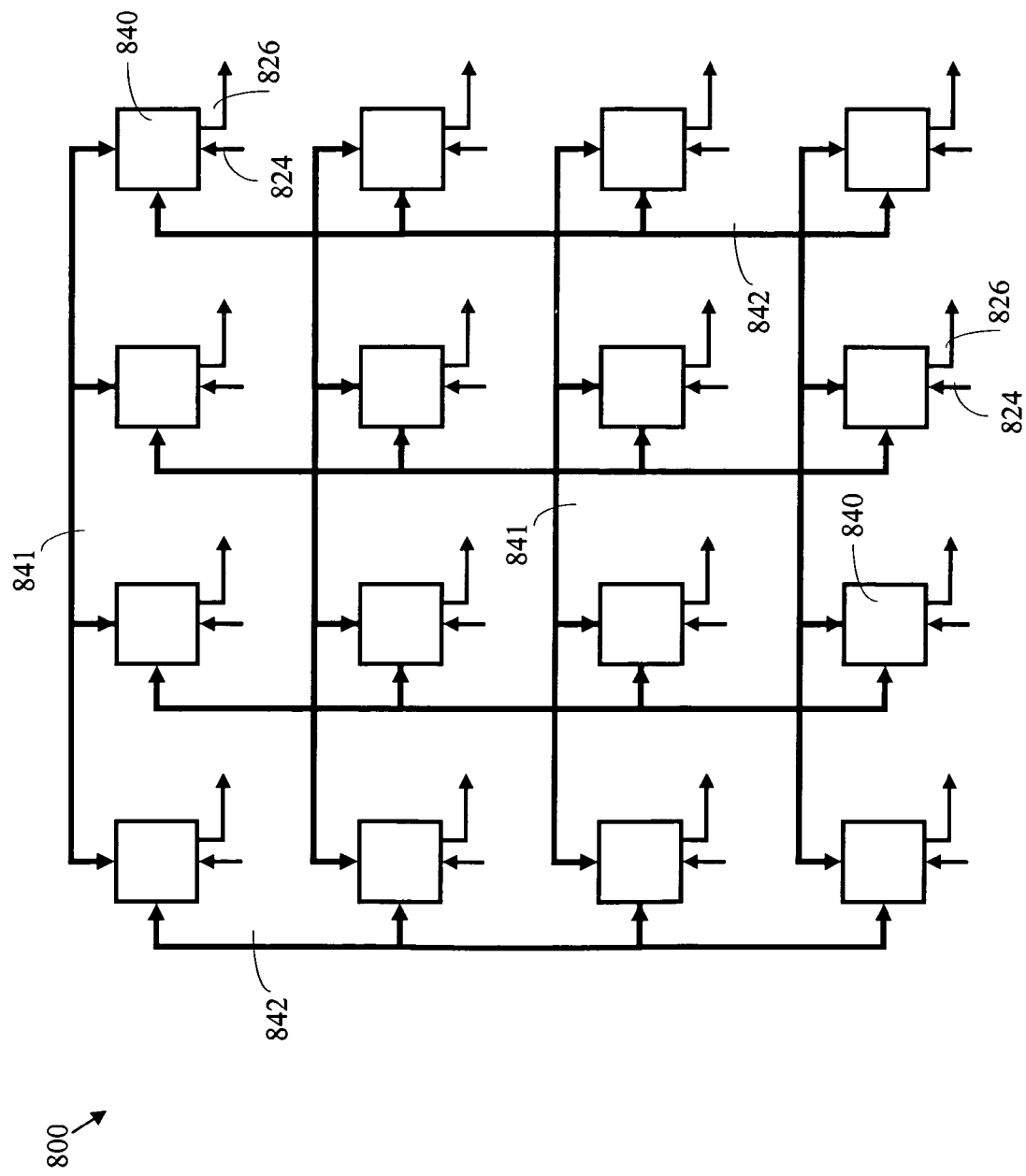
FIG. 8 illustrates a simplified lattice representation of the switch of FIG. 7.

The second-order mesh structure of FIG. 6 is equivalent to the lattice structure 700 of FIG. 7, which may provide a clearer view. In FIG. 7, switch units 740 are divided into groups. Each group of switch units 740 is arranged in a row (or a column) and connected switch units of different groups form a column (or a row). Channels 741 connecting switch units of the same row correspond to channels 641 (FIG. 6) connecting switch units 640 of the same group and channels 742 connecting switch units of the same column correspond to inter-group channels 642 in FIG. 6. A multi-channel link 724 may comprise several wavelength channels originating from source nodes and a multi-channel link 726 may comprise several wavelength channels directed to several sink nodes. To simplify further drawings, the interconnection of switch units 740 is concisely represented as in structure 800 of FIG. 8 where links 841 interconnects switch units 840 (corresponding to switch units 740) of the same row and links 842 interconnect switch units of the same column. Multi-channel links 824 and 826, corresponding to links 724 and 726 respectively, connect a switch unit 840 to external edge nodes.

With typical spatial traffic imbalance, the structure of FIG. 6, or its equivalent of FIG. 7, may require performing a fourth-order matching process for a considerable proportion of connections. In accordance with the present invention, balanced connectors may be used to avoid the use of fourth-order matching. As described in U.S. patent application Ser. No. 11/010,742, filed on Dec. 9, 2004 by Beshai and titled "Balanced Bufferless Switch", a modular balanced connector preferably connects to a prime-number of switch units.

Figure 9:
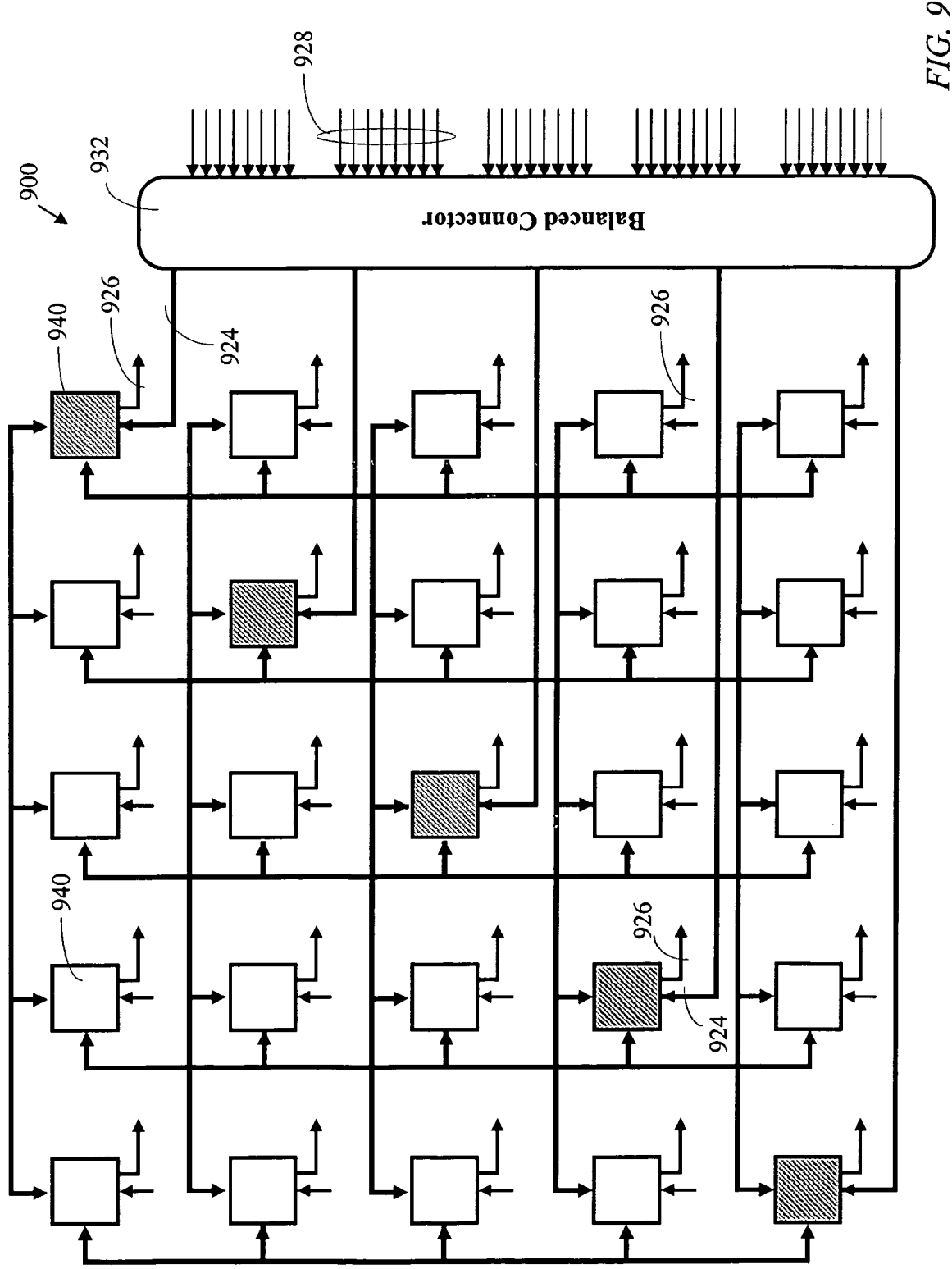
FIG. 9 illustrates a switch comprising switch units interconnected in a second-order mesh structure with each switch unit transmitting signals directly to edge modules but receiving signals from the edge nodes through balanced connectors according to an embodiment of the present invention; only one balanced connector connected to a diagonal array of switch units is illustrated.

FIG. 9 illustrates a lattice structure having five switch units 940 per row and five switch units 940 per column. A balanced connector may be provided per row or per column to distribute incoming payload signals from incoming wavelength channels equitably among the switch units 940. However, in order to maximize the proportion of connections that can be established in a single hop, hence requiring no more than a second-order temporal matching process, balanced connectors preferably connect to diagonals of switch units, while the mesh interconnection is applied to rows and columns. FIG. 9 illustrates a first balanced connector 932 connecting incoming channels 928 to the inputs of switch units 940 of a first diagonal in a 5×5 lattice structure of 25 switch units through channels 924. Switch units 940 connect directly to outgoing channels (egress channels) 926. Although a small number of switch units is used for illustration, it is understood that a row or a column may comprise a larger number, 23 for example, of switch units.

Figure 10:
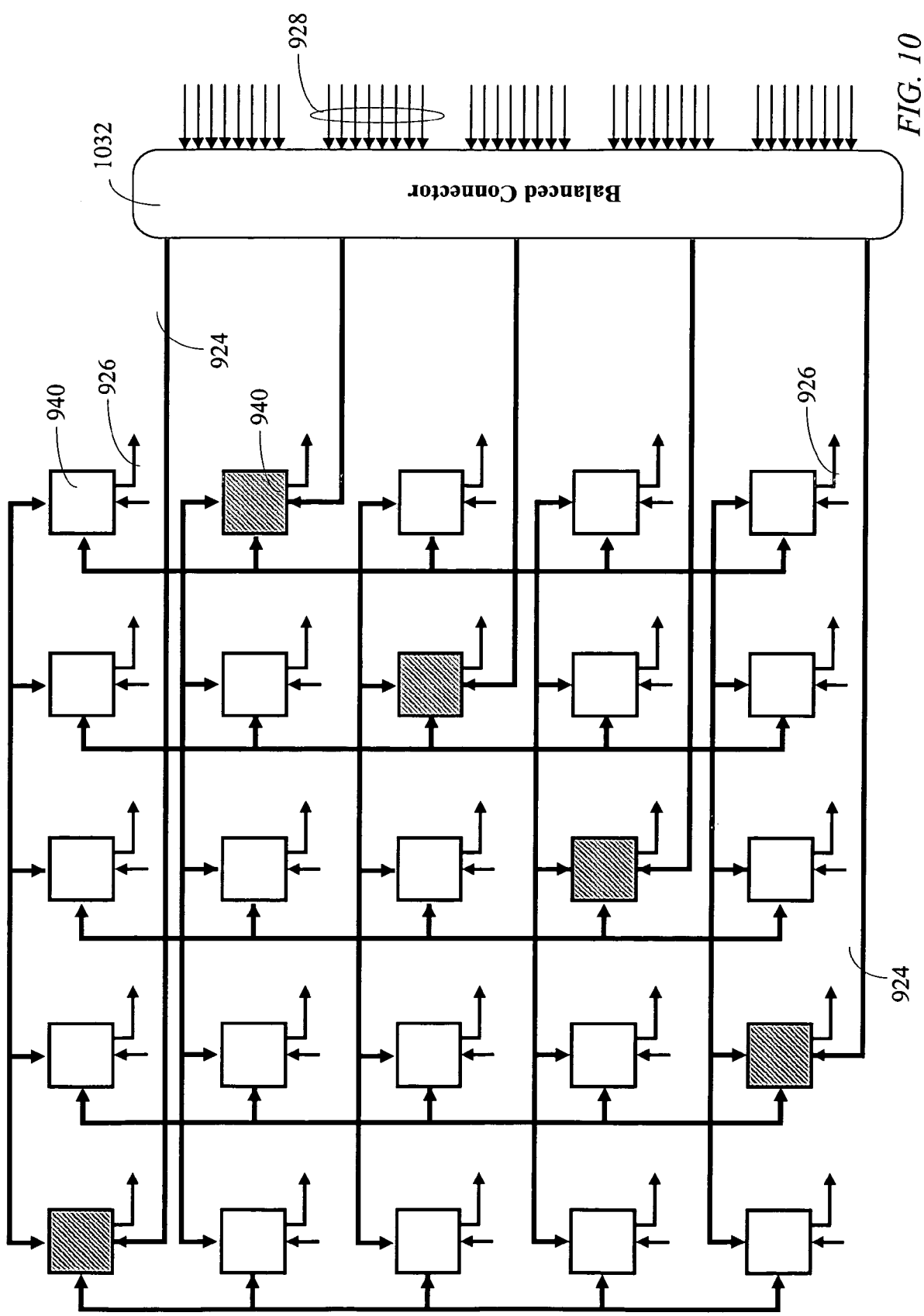
FIG. 10 illustrates the switch of FIG. 9 indicating a second balanced connector connecting to another diagonal array of switch units.

FIG. 10 illustrates a second balanced connector 1032 connecting incoming channels 928 to inputs of switch units 940 of a second diagonal in the same 5×5 lattice structure of FIG. 9. A total of five balanced connectors may be employed in the structure of FIG. 9 (or FIG. 10).

Figure 11:
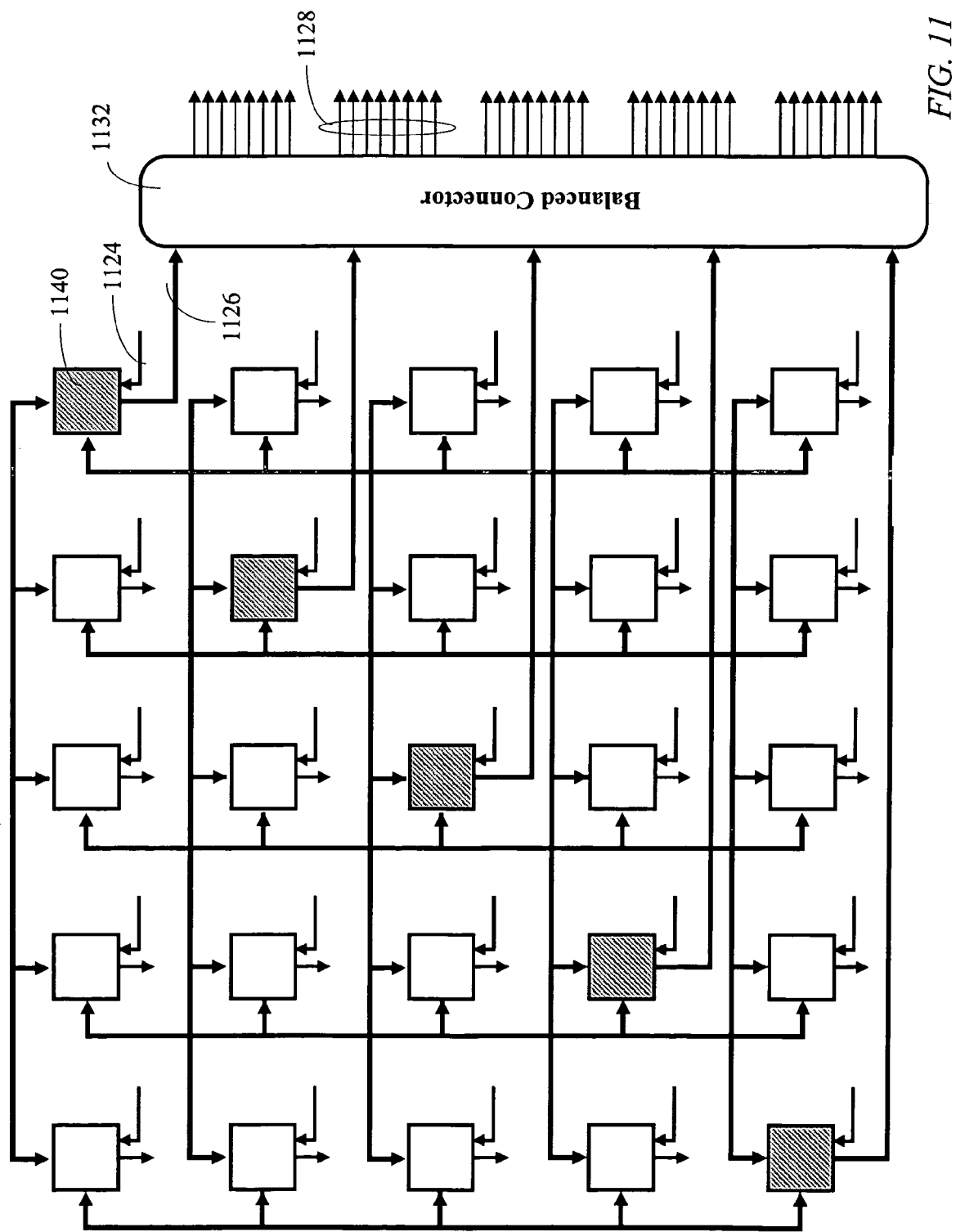
FIG. 11 illustrates a switch comprising switch units interconnected in a second-order mesh structure with each switch unit receiving signals directly from edge modules but transmitting signals to the edge nodes through balanced connectors, according to an embodiment of the present invention; only one balanced connector connected to a diagonal array of switch units is illustrated.

FIG. 11 illustrates an alternate arrangement where a balanced connector 1132 connects to the outputs of switch units 1140 of a first diagonal in a 5×5 lattice structure of switch units 1140. The incoming channels (ingress channels) 1124 have fixed access to respective switch units 1140 while outgoing channels (egress channels) 1128 have rotating access to switch units 1140 through output channels 1126 and balanced connector 1132.

Figure 12:
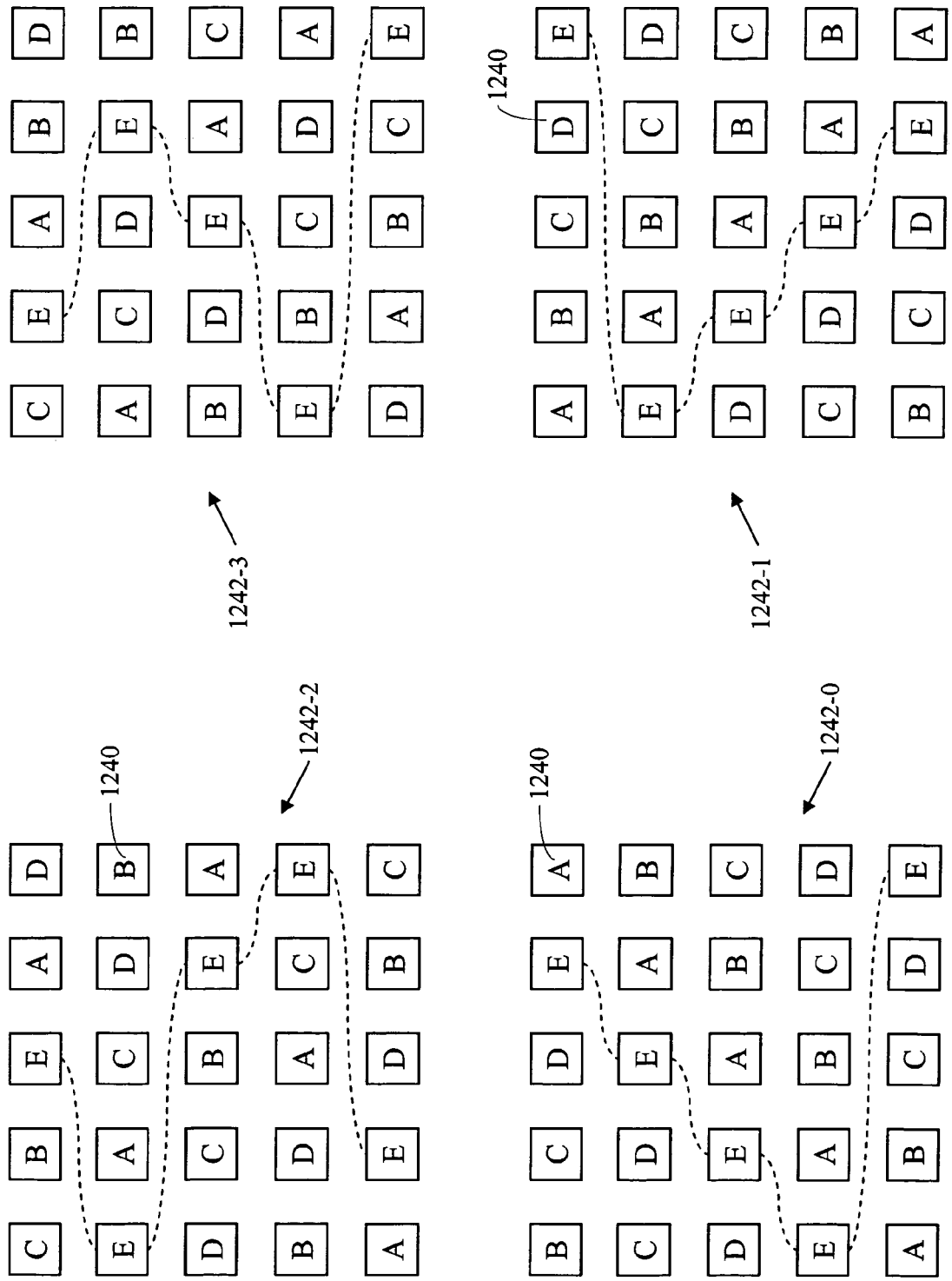
FIG. 12 illustrates example diagonal arrays of switch units in the lattice structure of FIG. 7 for use in an embodiment of the present invention.

FIG. 12 illustrates several ways of forming diagonal sets of switch units 1240 (corresponding to switch units 940 of FIG. 9 or switch units 1140 of FIG. 11) in a lattice structure. In arrangement 1242-0, the diagonals are aligned according to the familiar definition of a diagonal. In arrangements 1242-1, 1242-2, and 1242-3 the diagonal are formed according a more general definition which requires only that the switch units of a diagonal not belong to a common row or a common column, i.e., the switch units of a diagonal have non-intersecting coordinates, where coordinates of a switch unit are derived from the row and column to which the switch unit belongs as will be described with reference to FIG. 22.

Switch Dimension

To summarize, a switch of large dimension uses a lattice structure of switch units with balanced connectors connected at input to diagonal subsets of the switch units. In an alternative implementation, the balanced connector is connected at the output of diagonal subsets of switch units. The division of the switch units into diagonals requires only that the switch units of a diagonal have unique coordinates in the lattice structure.

Using switch units 940 or 1140 each of dimension 64×64, the 64 dual ports may be divided into 20 dual ports to connect to 20 edge nodes, 22 ports to connect to 22 switch units in a row, and 22 ports to connect to 22 switch units in a column. The lattice structure thus has 23 switch units per row and 23 switch units per column. The total number of access dual ports, i.e., dual ports connecting to edge nodes, is then 20×23×23=10580, i.e., the overall dimension of the lattice switch is 10580×10580. A total of twenty-three balanced connectors would be needed; one for each of 23 diagonal sets. Each balanced connector may have a modular structure as illustrated in FIG. 4 and may comprise 23 rotator units each of dimension 23×23. The rotation cycle includes 23 time intervals. Each time interval may be divided into $\chi>1$ time slots. During a time interval, a balanced connector changes connectivity and during a time slot, a switch unit may change connectivity. Using $\chi=64$ time slots per interval, the time frame would include 1472 time slots. The minimum duration of a time slot is dictated by the switching-speed of the switch units. With time slot duration of 80 nanoseconds, for example, the duration of a time interval would be 5.12 microseconds and the duration of a time frame would be 117.76 microseconds.

Each dual port may receive an incoming optical carrier modulated at 10 Gb/s and transmit an optical carrier modulated at 10 Gb/s, comprising signals switched from a number of incoming optical carriers. The capacity of the lattice switch is then 105 Terabits per second.

Control of a Second-Order Mesh Structure

Figure 13:
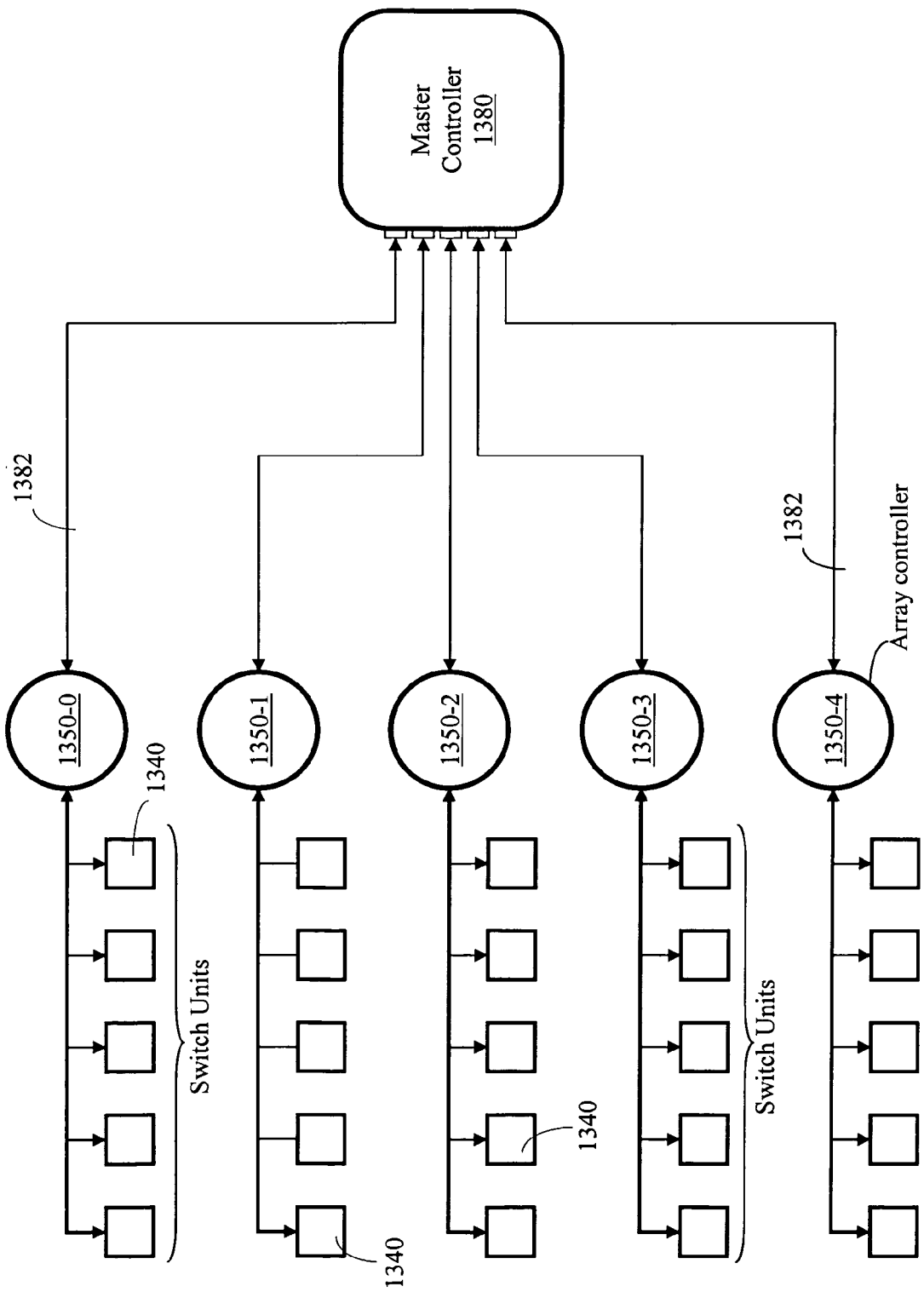
FIG. 13 illustrates a control system comprising array controllers coupled to a master controller according to an embodiment of the present invention.

FIG. 13 illustrates a control system that may be used to control a lattice structure similar to that of FIG. 9, wherein in FIG. 13 the switch units 1340 are analogous to the switch units 940 of FIG. 9. Each row of switch units 1340 has an associated array controller, for example array controllers 1350-0, 1350-1, 1350-2, 1350-3, and 1350-4. The array controllers are coupled to a master controller 1380 through dedicated two-way channels. Each array controller 1350 is also coupled to a slave controller (not illustrated in FIG. 13) of each switch unit 1340 in the respective array (row in this example). A slave controller simply sets the connectivity of a switch unit 1340 as indirectly instructed by the master controller 1380 through an array controller 1350. Each array controller 1350 is preferably associated with one of the switch units of the respective array and is accessed through a switched path. Each array controller 1350 communicates with the master controller 1380 and with edge nodes which may be collocated with the switch units 1340 or distributed over a wide geographic area. An incoming channel from an edge node can deliver a control signal via a balanced connector (not shown in FIG. 13) to a specific array controller 1350 during a time interval at which the incoming channel is connected to a switch unit hosting an array controller. An array controller 1350 can transmit control signals over any channel connected to a switch unit in the same row, or the same column, of the array controller. Other arrangements can be devised to reduce the number of array controllers if so desired.

Figure 14:
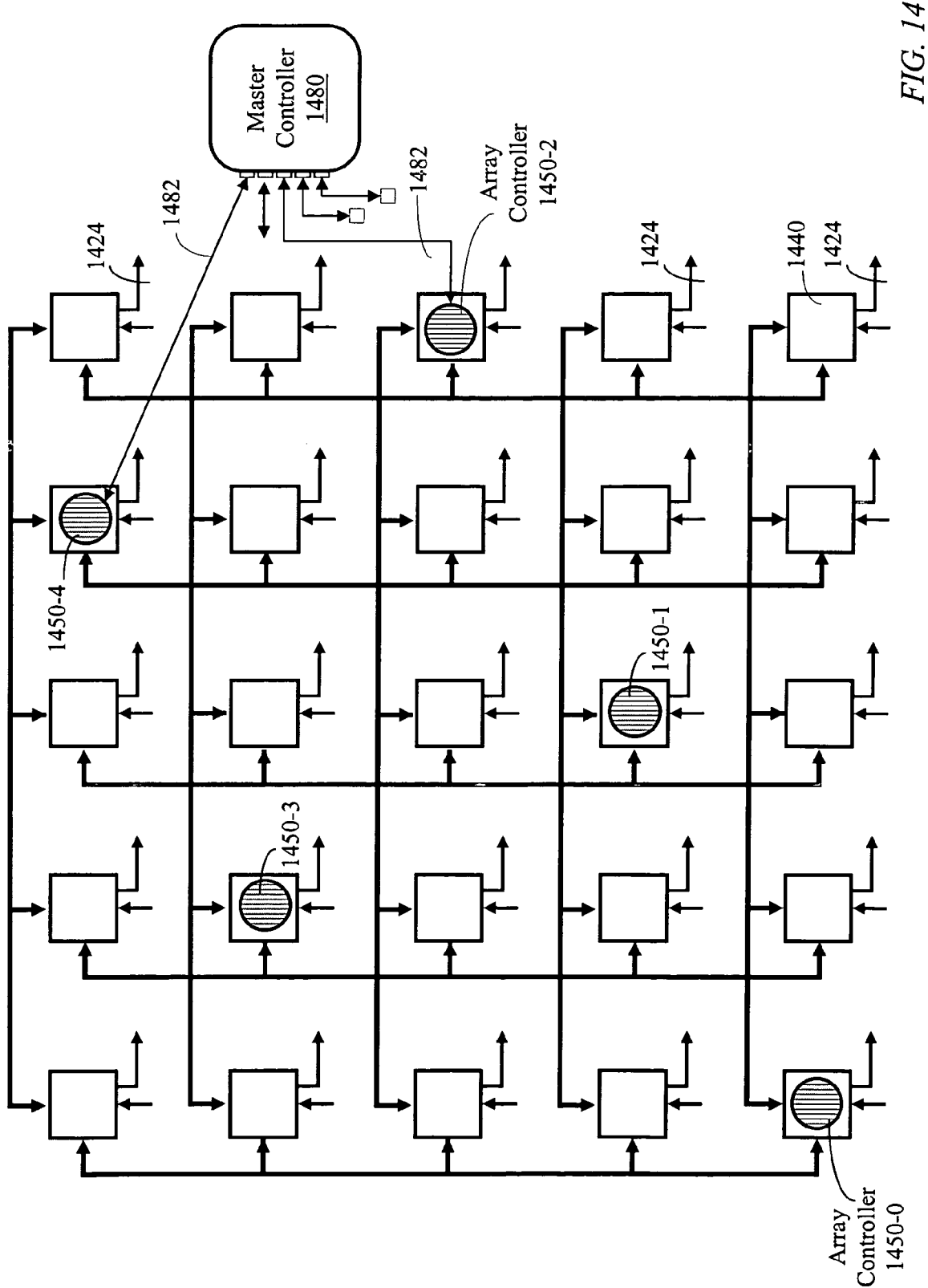
FIG. 14 illustrates the placement of the array controllers of FIG. 13 in the switch of FIG. 9 according to an embodiment of the present invention.

FIG. 14 illustrates an arbitrary selection of switch units 1440 (corresponding to switch units 940 of FIG. 9), one in each row, to host an array controller 1450 for all the switch units 1440 of the row. Each array controller 1450 can be accessed by a set of edge nodes (edge routers) through a balanced connector as illustrated in FIG. 9 and may receive control messages from the set of edge nodes. Each array controller 1450 then processes the control messages and relays control data to the master controller 1480 which has a direct two-way path 1482 for each array controller 1450. The master controller 1480 sends control messages destined to edge nodes through array controllers. Control signals from an array controller 1450 to edge nodes are transmitted over outgoing channels 1424. Control signals from an edge node to a designated array controller are preferably allocated a specific time slot within a time interval during which the edge node is directly accessing the switch unit hosting the designated array controller. The use of a pre-allocated control time slot significantly simplifies the separation of control signals from payload signals.

Figure 15:
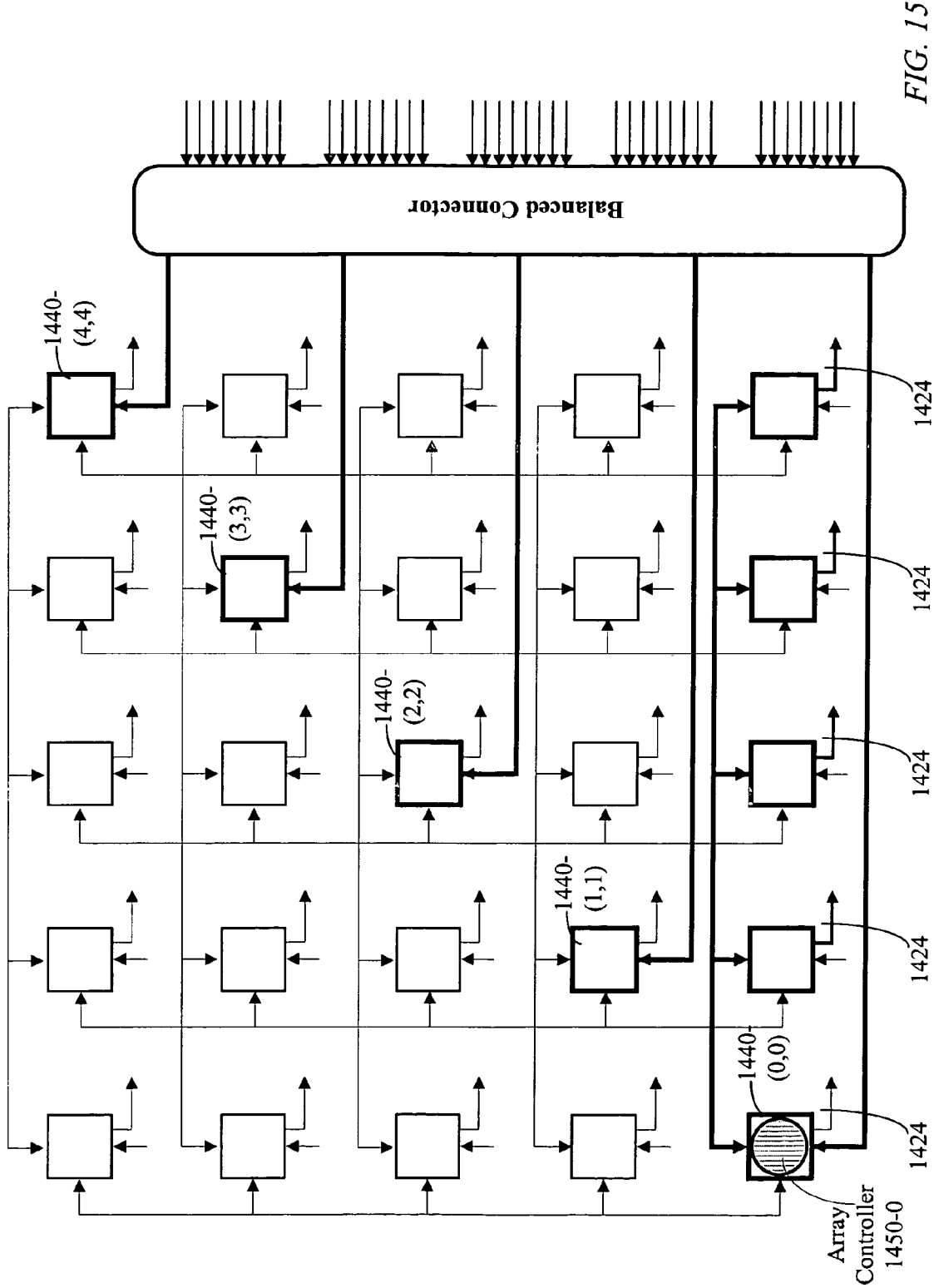
FIG. 15 illustrates the control domain of an array controller in the control system of FIG. 13.

FIG. 15 highlights the switch units 1440 (corresponding to switch units 940 of FIG. 9) associated with an array controller 1450-0 (FIG. 14). Array controller 1450-0 receives control data from edge nodes accessing a diagonal set of switch units 1440-(0,0), 1440-(1,1), 1440-(2,2), 1440-(3,3), and 1440-(4,4) but transmits control data, through outgoing channels 1424, to any edge node permanently connected to output ports of switch units in the same row (or in the same column) of the array controller 1450-0.

Figure 16:
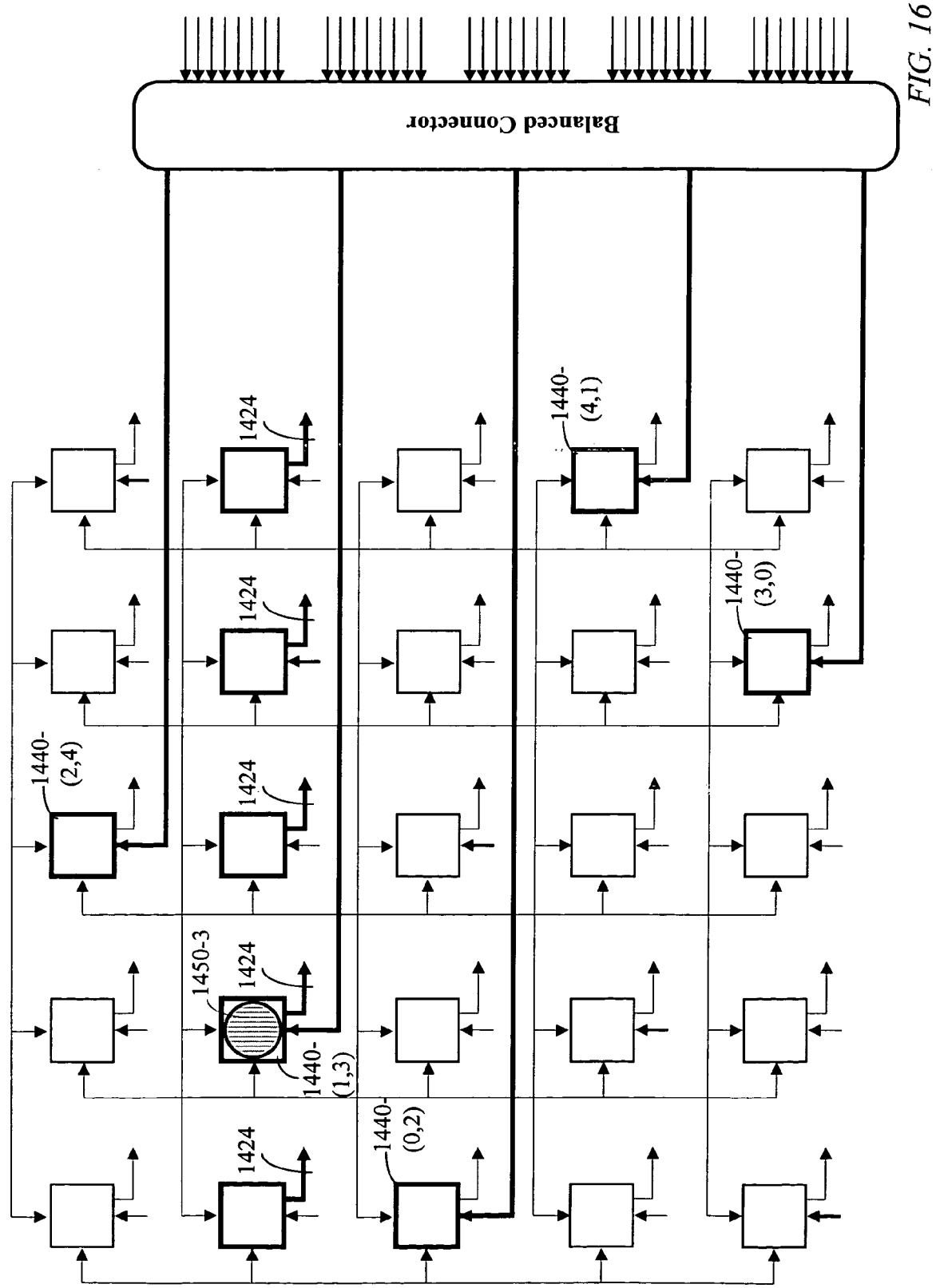
FIG. 16 illustrates the control domain of another array controller in the control system of FIG. 13.

FIG. 16 highlights the switch units controlled by another array controller 1450-3 (FIG. 14). Array controller 1450-3 receives control data from edge nodes accessing a diagonal set of switch units 1440-(3,0), 1440-(4,1), 1440-(0,2), 1440-(1,3), and 1440-(2,4) but transmits control data, through outgoing channels 1424, to any edge node permanently connected to output ports of switch units in the same row (or in the same column) of the array controller 1450-3.

Figure 17:
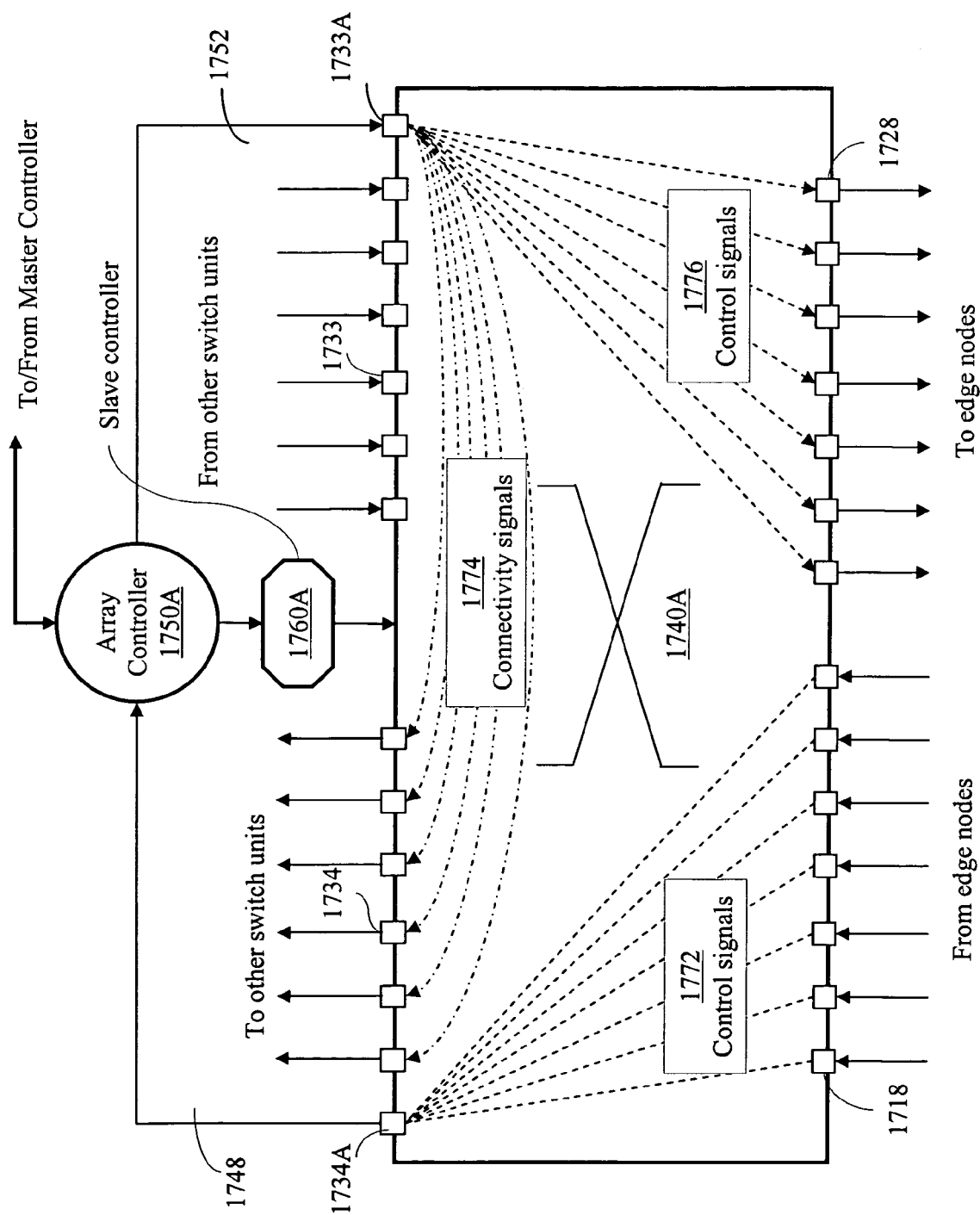
FIG. 17 illustrates the connectivity of an array controller to a switch unit selected to host an array controller of the switch of FIG. 9 where the array controller exchanges control signals with slave controllers of switch units of an array and with external nodes, such as edge nodes.

FIG. 17 illustrates a switch unit 1740A, which may be used as one of the switch units 940 in the lattice structure of FIG. 9. The inner side of a switch unit 1740A includes outward ports 1734 and inward ports 1733. The switch unit 1740A supports an array controller 1750. The input of the array controller 1750A is connected to an outward port 1734A of the switch unit 1740A and the output of the array controller 1750A is connected to an inward port 1733A of the switch unit 1740A. This arrangement enables the exchange of control signals between the array controller 1750A and all edge nodes that access the switch unit 1740A either permanently or during designated time intervals through a balanced connector. Slave controller (connectivity controller) 1760A of switch unit 1740A is connected directly to array controller 1750A. Switched control paths 1772 carry control signals received at inlet ports 1718 of switch unit 1740A to the array controller 1750A through designated outward port 1734A and a channel 1748. Switched control paths 1776 carry control signals from the array controller 1750A to outlet ports 1728 of the switch unit 1740A through a channel 1752 and designated inward port 1733A. Switched control paths 1774 carry control signals to other switch units 1740A through outward ports 1734. The control signals conveyed through paths 1774 are primarily switch-fabric control signals, herein called connectivity signals, directed to slave controllers 1760 of other switch units 1740. As stated earlier, each switch unit 1740A, including the particular switch unit hosting the array controller 1750, is accessed during each rotation cycle by a subset of edge nodes which may not be collocated with the switch unit 1740A. Each edge node in the subset of edge nodes can, therefore, exchange control signals with the array controller 1750A through its host switch unit 1740A. Alternative arrangements can be devised to deliver control signals to, and receive control signals from, the array controller 1750. Furthermore, a switch unit 1740A may host a second array controller (not illustrated) for reliability and, possibly, for load sharing.

Figure 18:
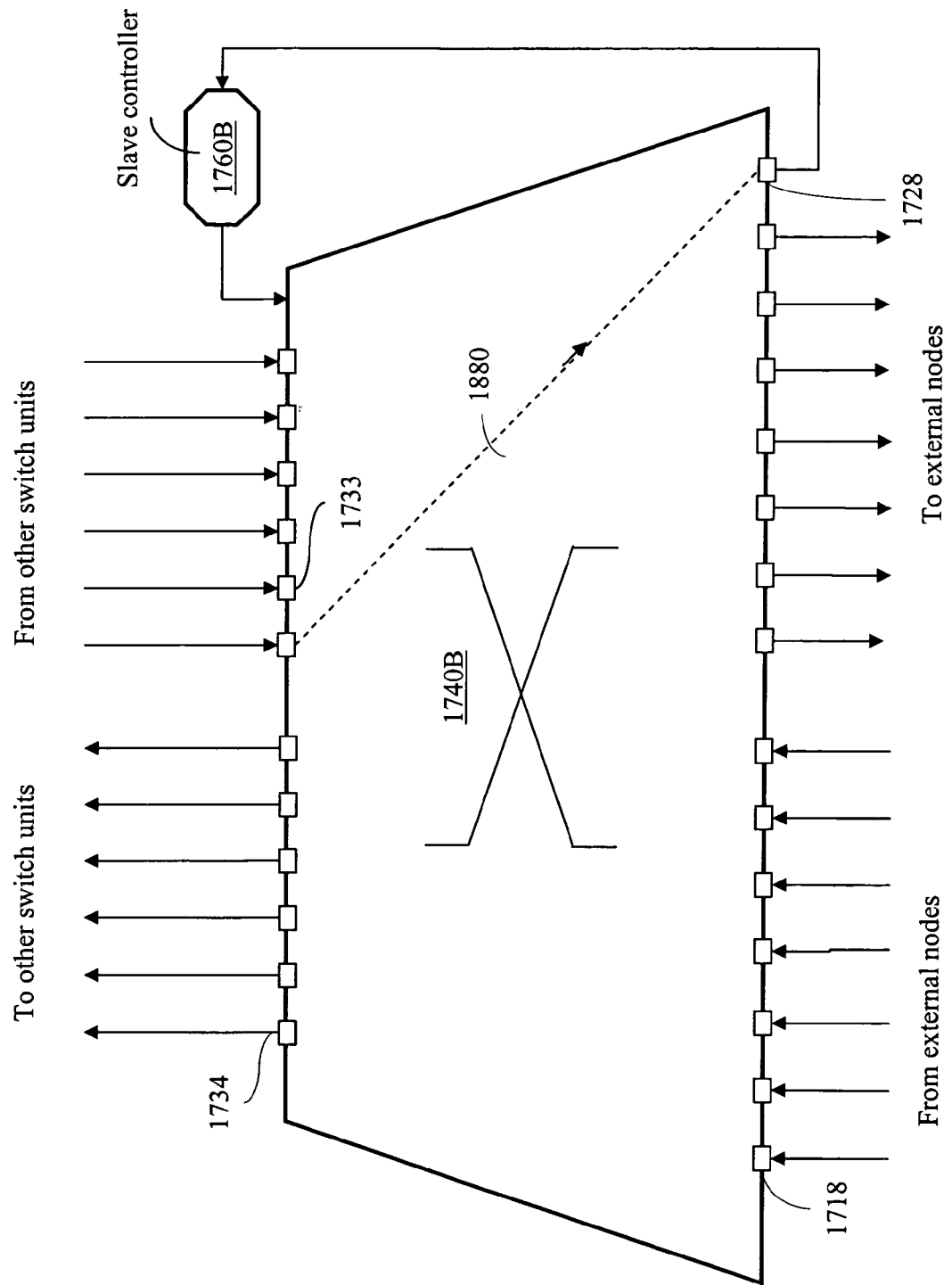
FIG. 18 illustrates a control-path in a switch unit in the switch of FIG. 9 for communicating signals from the array controller of FIG. 17, in accordance with an embodiment of the present invention.

FIG. 18 illustrates the control path in a switch unit 1740B receiving control signals from array controller 1750A of FIG. 17. Inward port 1733 may receive both connectivity-control signals and payload signals. The connectivity-control signals are switched through the switch fabric of switch unit 1740B, as indicated by switched path 1880, to an outlet port 1728 connecting to a slave controller 1760B which controls the internal connectivity of the switch fabric of switch unit 1740B.

Figure 19:
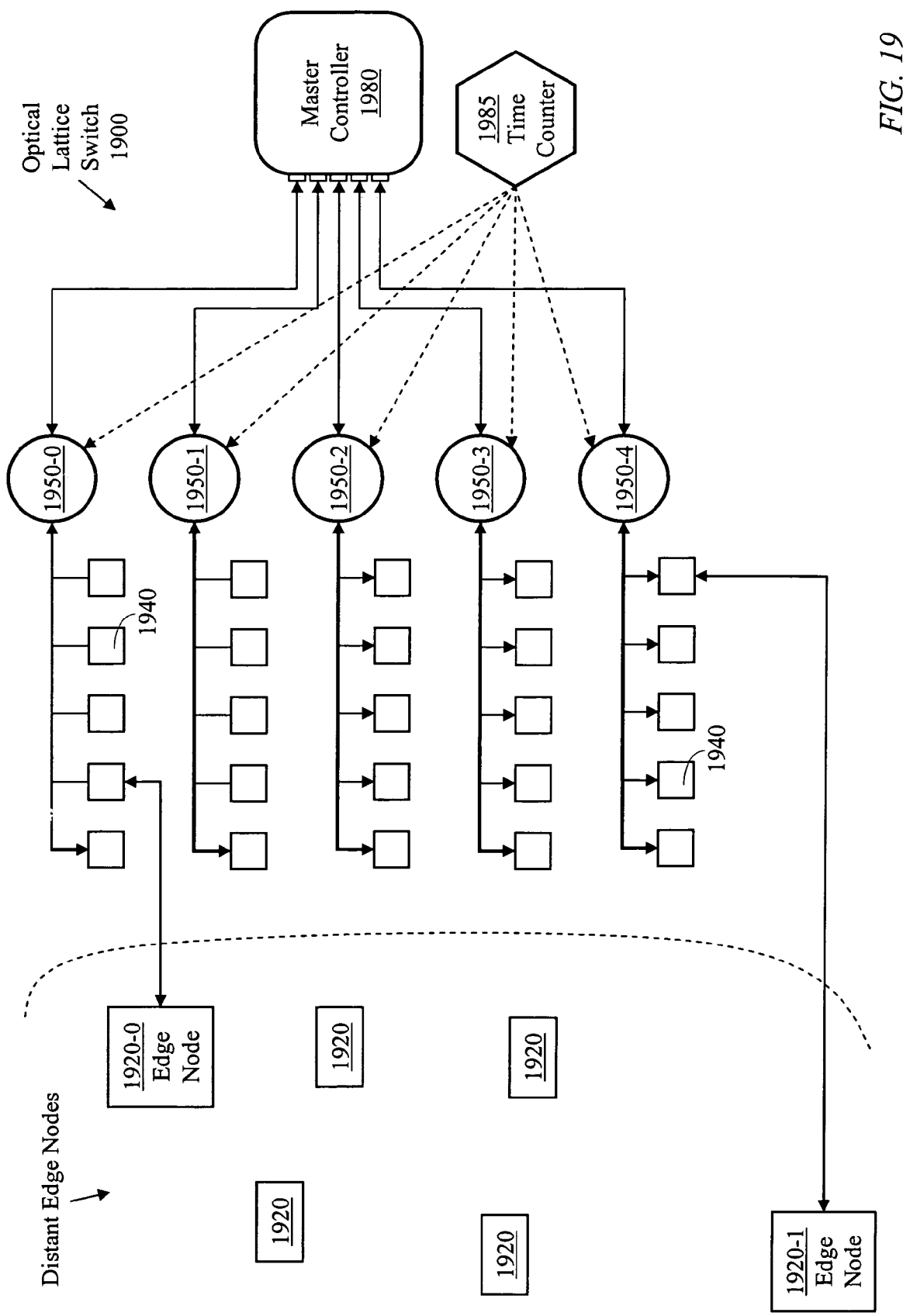
FIG. 19 illustrates control paths from the control system of FIG. 13 of the switch of FIG. 9 to remote edge nodes, the control system further including a time counter for use in time-locking the remote edge nodes to the switch according to an embodiment of the present invention.

FIG. 19 illustrates a control system similar to that of FIG. 13 but with added time counter 1985 to be used for time coordination with remote external nodes such as edge nodes. Each row of switch units 1940 has an array controller 1950. Five array controllers 1950-0, 1950-1, 1950-2, 1950-3, and 19504 are illustrated. The array controllers are coupled to master controller 1980 through dedicated two-way channels. Each array controller 1950 is also coupled to a slave controller (similar to slave controller 1760A of FIG. 17) of each switch unit 1940 in the respective array (row in this example). A slave controller simply sets the connectivity of a switch unit 1940 according to instructions of the master controller 1980 relayed through an array controller 1950. Time counter 1985 provides a reference time to be observed by all edge nodes accessing the entire optical lattice switch 1900. An edge node 1920 located at a significant distance from the optical lattice switch 1900 executes a time-locking process to align its time with the time reference set by the time counter 1985.

Scheduling in a Second-Order Mesh Structure

A path traversing two or more space switches operated in a TDM mode with interposing data buffers can be established by independently establishing a path within each space switch according to a first-order matching process, and the matching time-slot selected in the space switches need not be contemporaneous because time-slot interchange at the interface of two successive space switches is feasible. In a switch using optical switch units, data buffering is not feasible with the current state of the art and a compound matching process of order G requires concurrent time slot availability in (G+1) ports as will be detailed below.

In a first-order matching process, a connection requesting a single time slot or multiple time slots requires each time slot to be free in two corresponding ports. With a compound, second-order matching process, a connection having multiple time slots requires that each time slot in the connection be free in three corresponding ports. With a compound third-order matching process, a connection having multiple time slots requires that each allocable time slot be free in four corresponding ports.

Figure 20:
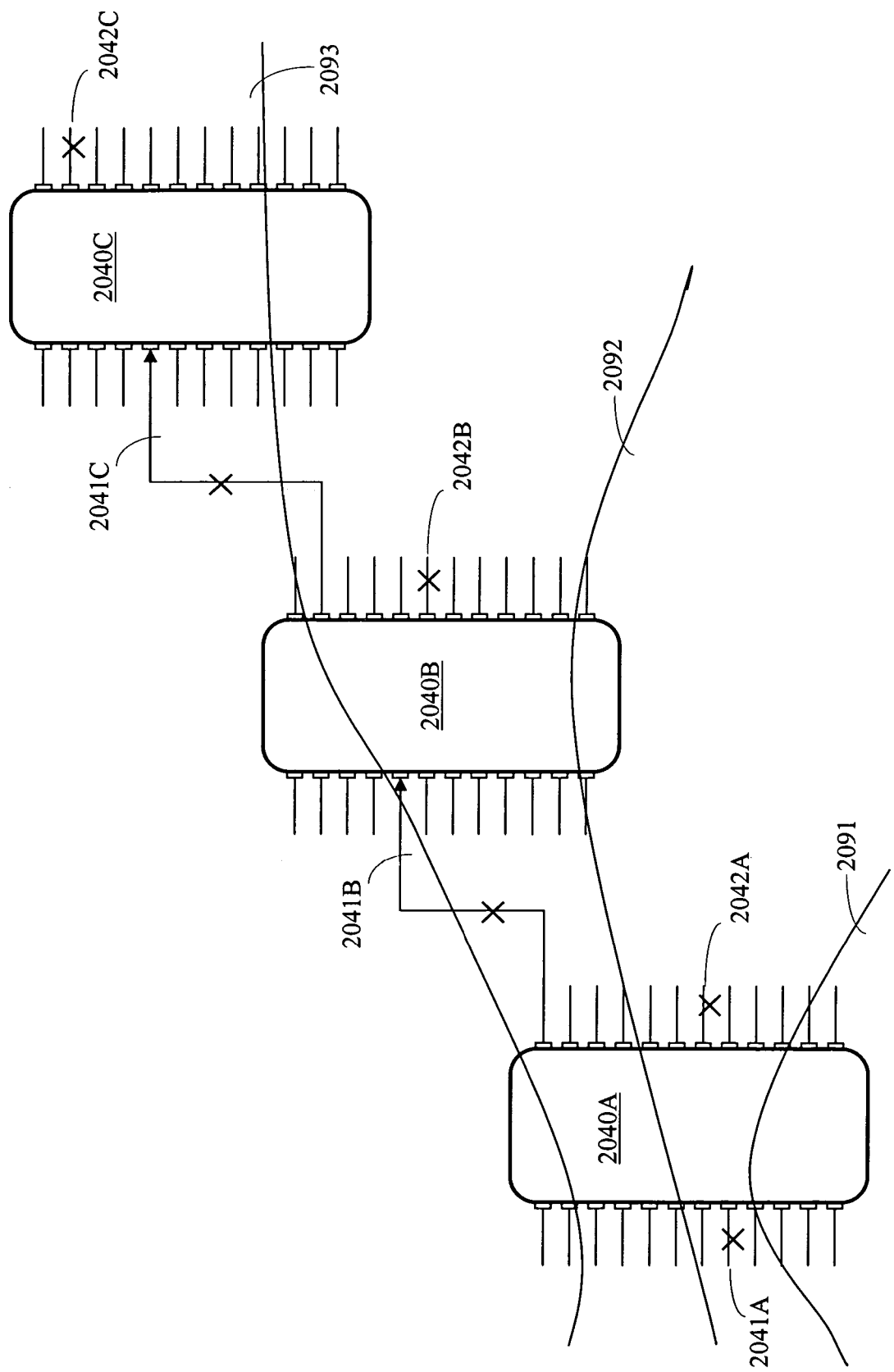
FIG. 20 illustrates a path traversing a single bufferless switch requiring a first-order matching process, a path traversing two bufferless switches requiring a second-order matching process, and a path traversing three bufferless switches requiring a third-order matching process within the second-order mesh switch of FIG. 9.

FIG. 20 illustrates three paths 2091, 2092, and 2093 respectively traversing: one switch unit 2040A; two switch units 2040A and 2040B; and three switch units 2040A, 2040B, and 2040C. With the absence of buffers, and hence the need for a compound time-slot-matching process, establishing time-multiplexed paths is facilitated using packing techniques that were developed originally for single-stage time-multiplexed space switches requiring only first-order matching. The time-slot-matching process may use occupancy arrays, to be further described with reference to FIG. 21, each associated with a channel and indicating the occupancy state (free or busy) of the channel during each time slot in the time frame. A first-order path through switch unit 2040A from an input channel 2041A to an output channel 2042A requires a first-order time-slot-matching process using occupancy arrays associated with channels 2041A and 2042A. A path from input channel 2041A to output channel 2042B traverses two switch units, 2040A and 2040B, and requires a second-order time-slot-matching process using occupancy arrays associated with channels 2041A, 2041B, and 2042B. A path from input channel 2041A to output channel 2042C traverses three switch units and requires a third-order time-slot-matching process using occupancy arrays associated with channels 2041A, 2041B, 2041C, and 2042C.

Figure 21:
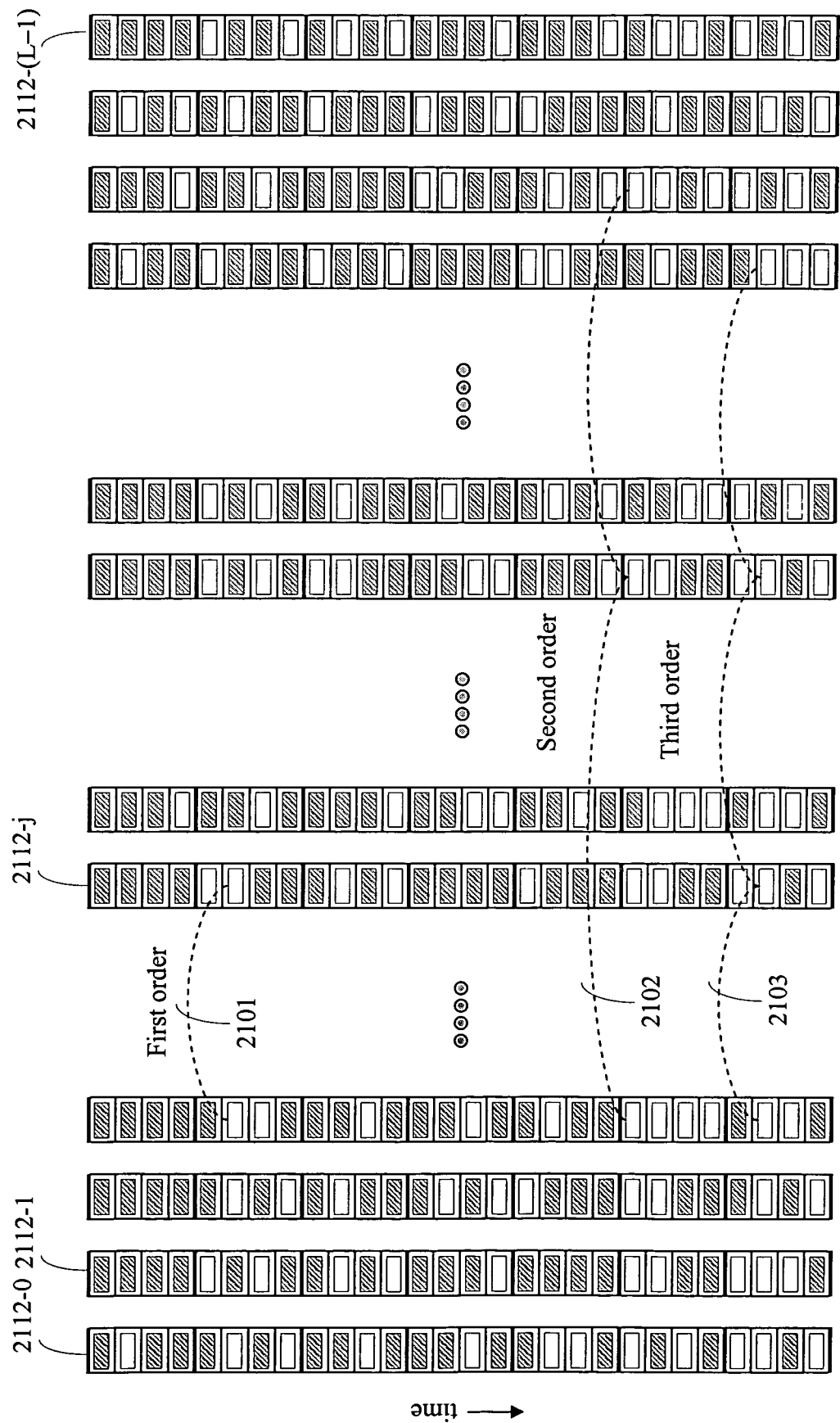
FIG. 21 illustrates occupancy arrays employed by the master controller in the control system of FIG. 13 for scheduling connections within the switch of FIG. 9, in accordance with an embodiment of the present invention.

FIG. 21 illustrates occupancy arrays 2112 for use by master controller 1380 or 1980 to establish paths across a lattice switch according to the present invention. Each array includes a number of cells equal to the number of time intervals per time frame multiplied by the number of time slots per time interval. For clarity of the figure, the illustrated arrays 2112 relate to a time frame having only seven time intervals each interval including only four time slots. Each array corresponds to a single channel leading to a switch unit or leading to an external node, such as a collocated or remote edge node. In a high-capacity core switch of a broadband network, the number of time slots per time frame may be of the order of 1000; for example with switch units of 64×64 dimension each, and with 64 time slots per time interval, the number of time slots per time frame is 1472 as described earlier. Using 44 dual ports to connect to 22 switch units of a row and 22 switch units of a column, the lattice dimension becomes 23×23. The total number of switch units is 529, the total number of inner channels is 23276 and the total number of outer channels is 21160. Thus, the required total number of occupancy arrays is 44436 (arrays 2112 are labeled 2112-0 to 2112-(L−1), L being 44436 in the above example).

As illustrated in FIG. 21, a first-order path 2101 traverses one switch unit (corresponding to path 2091 of FIG. 20), a second-order path 2102 traverses two switch units (corresponding to path 2092 of FIG. 20), and a third-order path 2103 traverses three switch units (corresponding to path 2093 of FIG. 20). A process of mapping the incoming channels from the edge nodes to the input ports of the lattice switch (FIG. 9 or FIG. 11) precedes the use of arrays 2112 for establishing a path for each flow.

Switch Unit and Port Identifiers

A switch unit 940 of FIG. 9 has inner dual ports connecting to other switch units and outer dual ports connecting to edge nodes. Each outer dual port connects to an incoming wavelength channel from an edge node and an outgoing wavelength channel to an edge node. Preferably the incoming and outgoing channels of a dual port connect to the same edge node. In the lattice switch of FIG. 9, an upstream channel from an edge node has cyclic access to a subset of switch units 940 while each edge node has a fixed downstream channel from a switch unit. In the lattice structure of FIG. 11, an upstream channel has fixed access to a switch unit 1140 while a downstream channel has cyclic access to a subset of switch units 1140. For ease of scheduling, it is preferable that, during the first time interval of the time frame, the upstream and downstream channels of each edge node connect to the same switch unit, herein called a "common switch unit." An outer dual port, hence the connecting dual channel, may be identified according to the common switch unit. A switch unit may be identified by coordinates derived from the row and column to which the switch unit belongs. A dual port number would then be identified by a tuple {X.Y.J} where X is a column index, Y is a row index, and J is a dual-port index.

Figure 22:
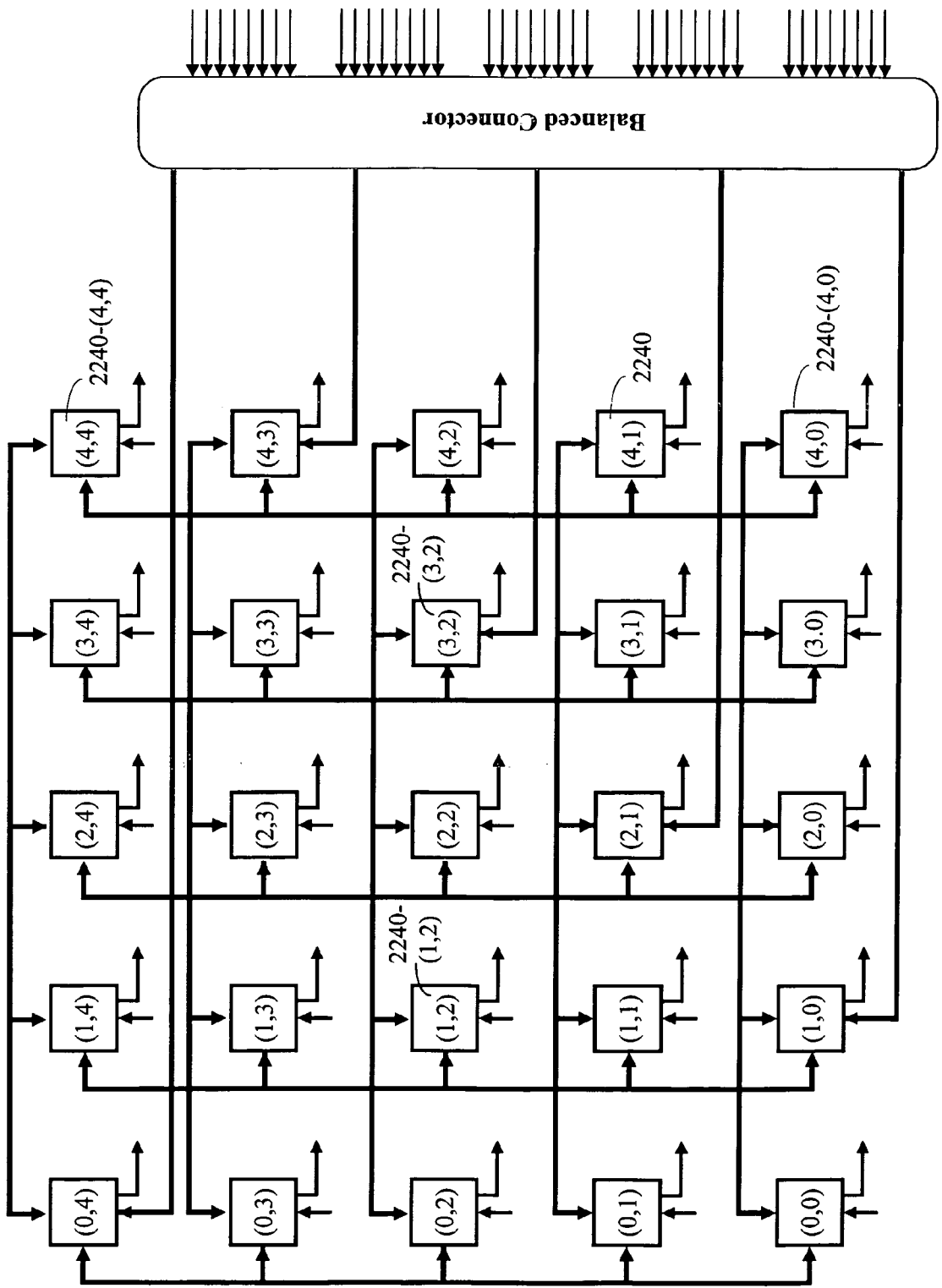
FIG. 22 illustrates switch-unit coordinate labeling to facilitate the scheduling process for the switches of FIGS. 9, 10, and 11.

To facilitate the process of path allocation within the lattice switch fabric, it is convenient to associate switch-unit coordinates with each of the switch units 940 and 1140 (FIGS. 9 and 11). FIG. 22 illustrates a coordinate-based labeling scheme for switch units 2240 (corresponding to switch units 940 of FIG. 9 or 1140 of FIG. 11). Each switch unit 2240 is further identified as 2240-$uv$, where u is a sequential number of the column to which the switch unit 2240 belongs and v is the sequential number of the row to which the switch unit belongs. To simplify the diagram, only the indices u and v are indicated for most of the switch units 2240. The temporal relationship between the rotating access of an upstream channel and the fixed access of a downstream channel can be derived directly from the label of the switch unit accessed by the upstream channel during a reference time interval and the label of the switch unit connecting to the downstream channel in the structure of FIG. 9 (and vice versa in the structure of FIG. 11). For example, an upstream channel initially connecting to switch unit labeled (0, 1) in FIG. 22 is row-aligned with a target switch unit labeled (2, 4) during time interval $\tau$=3 and is column-aligned with the target switch unit during time interval $\tau$=2 of the time frame. In order to induce an occupancy gradient, to be described below, a connection from the switch unit labeled (0,1) to the target switch unit is first sought during time interval $\tau$=2.

Figure 23:
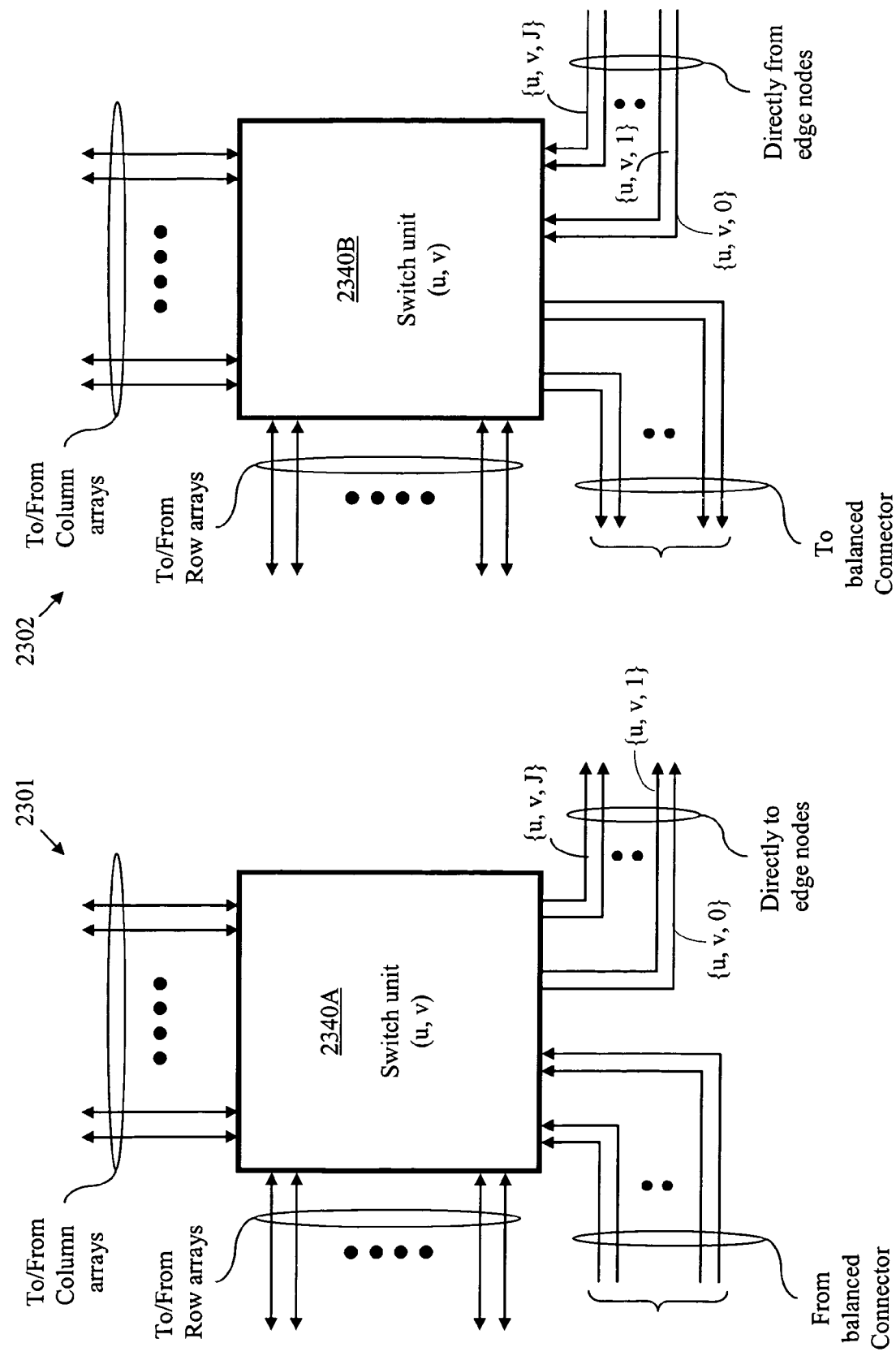
FIG. 23 illustrates outer-channel labeling based on association with switch units for use in the scheduling process in the switches of FIGS. 9, 10, and 11.

FIG. 23 illustrates the labeling of fixed-access downstream channels connected to a switch unit 2340A (corresponding to switch unit 940 of FIG. 9) and the labeling of fixed-access upstream channels connected to a switch unit 2340B (corresponding to switch unit 1140 of FIG. 11). The fixed-access downstream channels from switch unit 2340A having coordinates (u, v) are labeled {u, v, 0} to {u, v, J), where J is the number of downstream channels. Likewise, the fixed-access upstream channels to switch unit 2340B having coordinates (u, v) are labeled {u, v, 0} to {u, v, J}, where J is the number of upstream channels.

Spatial Equalization—Temporal Packing

The term "occupancy gradient" is used herein to refer to the temporal occupancy distribution of switch ports or corresponding channels in a switching node. If the occupied time slots of a port are randomly distributed over a time frame, each time slot is equally likely to be occupied and the occupancy gradient is zero. A significant occupancy gradient results if some time slots are consistently more occupied than other time slots within the time frame. It is well known that a steep occupancy gradient significantly increases the throughput of a single-stage space switch. It is also well known that a process of "temporal packing" induces a temporal occupancy gradient in a single-stage space switch using a first-order time-slot-matching process. In the aforementioned U.S. patent Ser. No. 10/223,222, a compound higher-order time-slot-matching process using temporal packing was introduced in a mesh structure. A similar temporal packing process is desirable in the second-order mesh structure of the present invention which relies on a composite process of spatial equalization and temporal packing.

In the structure of FIG. 9, an incoming channel cyclically steps along a number of switch units 940 in order to spatially distribute its traffic among the switch units and create the equivalence of balanced spatial traffic. While this spatial equalization reduces the mean number of hops in establishing a path within the switch, and thereby reduces the order of the matching process, the temporal matching process between any two channels can also benefit significantly from temporal packing where selected time slots in a scheduling time frame are kept at high occupancy and other time slots are kept at lower occupancy. Temporal packing does not happen naturally; it is induced by consistently starting the search for matching time slots from a reference time slot; most conveniently the reference time slot is a time-slot given an index of zero where the time slots of the time frame are indexed as 0 to (S−1), S being the total number of time slots per time frame.

Temporal packing in a switch using a single switch unit is straightforward. In the lattice structure of FIG. 9, temporal packing should be coordinated with the spatial selection of internal paths. A connection may be established along any of alternate spatially-disjoint paths and, within each path, during any of numerous subsets of time slots. This rich set of internal-routing options may be exploited to maximize routing efficiency by selecting shorter routes (fewer hops) while increasing the matching opportunity by creating an appropriate occupancy gradient.

Under severe spatial traffic imbalance, a path from an incoming channel to an outgoing channel may traverse an intermediate switch unit thus requiring a third-order time-slot matching process. Referring to FIG. 22, the paths from an upstream channel that connects to switch unit labeled (0,0) during time interval 0 may transmit signals to a downstream channel permanently connecting to the switch unit labeled (2, 4), for example, through two second-order paths and six third-order paths. In general, an m×m lattice has a total of m paths from any incoming channel to any outgoing channel, which include at most one first-order path, at most two second-order paths and at most (m−1) third-order paths. A first-order path precludes second-order paths, resulting in (m−1) third-order paths. This is because a first-order path occurs only when the accessed switch unit and the target switch unit belong to a common diagonal set. Second-order paths result only if the accessed switch unit and the target switch unit belong to different diagonal sets, in which case the number of second-order and third-order paths are 2 and (m−2), respectively. The incoming channel connecting to switch unit (0,0) during time-interval 0 accesses switch units (1,1), (2,2), (3,3), and (4,4) during time intervals 1, 2, 3, and 4, respectively. The two second-order paths are path {(2,2), (2,4)}, which occurs during time-interval $\tau$=2, and path {(4,4), (2,4)} which occurs during time-interval $\tau$=4.

The six third-order paths are:
{ (0,0), (2,0), (2,4)} and { (0,0), (0,4), (2,4)} during time interval $\tau$=0;
{ (1,1), (2,1), (2,4)} and { (1,1), (1,4), (2,4)} during time interval $\tau$=1; and
{ (3,3), (2,3), (2,4)} and { (3,3), (3,4), (2,4)} during time interval $\tau$=2.

Figure 24:
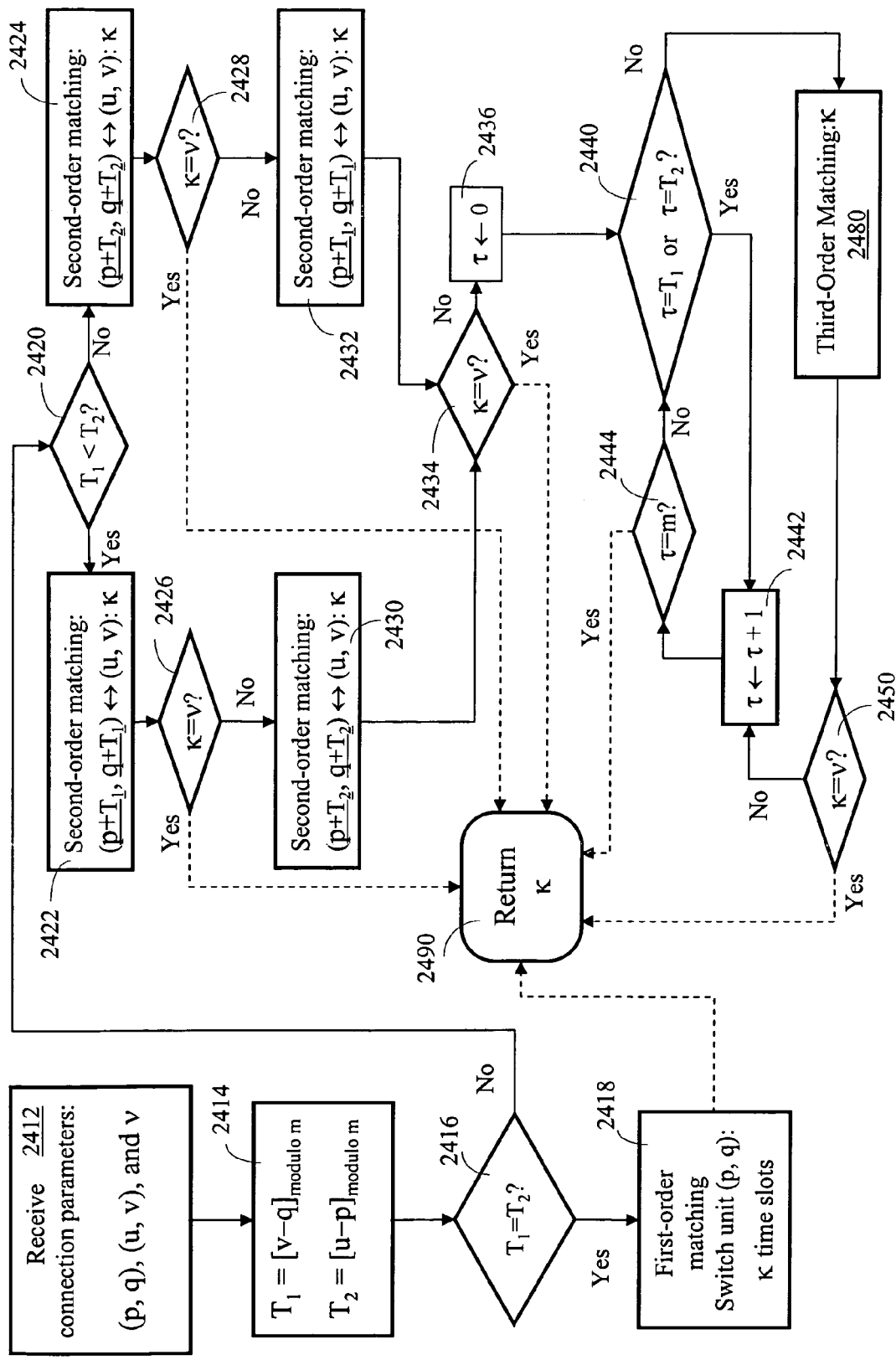
FIG. 24 is a flow chart depicting the main steps in a connection scheduling process in the switch of FIG. 9.

FIG. 24 is a flow chart provided to illustrate exemplary steps that may be performed during a connection scheduling process, according to the present invention. The process is implemented in the master controller 1380 (FIG. 13) associated with switch of FIG. 9. The process aims at realizing a balance between spatial equalization and temporal matching.

At step 2412, the master controller 1380 receives connection parameters from an array controller 1350. The parameters include: (1) the coordinates (p, q) of the source switch unit 940 to which an incoming channel from a source edge node is connected during a pre-selected reference time interval, conveniently selected to be time-interval zero; (2) the coordinates (u, v) of the destination switch unit 940 which connects to the outgoing channel leading to a destination edge node, and (3) a required number v>0 of time slots per time frame for a requested connection. As described above, a time frame includes a number of rotating-access time-intervals, with each time interval comprising a number $\chi > 0$ of time slots. During an access interval, up to $\chi$ data units may be transmitted to a fixed-access outgoing channel.

Selecting time-interval zero as the reference time interval, the time interval during which the incoming channel accesses a switch unit of coordinate (x, v) where 'x' indicates any first coordinate, is $T_1 = [v-q]_{modulo\ m}$, where m is the number of switch units in a diagonal set. The time interval during which the incoming channel accesses a switch unit of coordinate (u, y), where y is any second coordinate, is $T_2 = [u-p]_{modulo\ m}$. The trajectory of the incoming channel traverses the target switch unit of coordinate (u, v), i.e., the switch unit to which the destination edge node is permanently connected, only if $T_1 = T_2$. If this condition is met, as determined in step 2416, then a simple first-order temporal matching process is exercised at step 2418 to determine if the required number, v, of matching time slots can be found. If the number $\kappa$ of matching time slots is less than v, the process is terminated in step 2490. If the number $\kappa$ equals v, then identifiers of the $\kappa$ matching time slots are sent to a respective array controller (step 2490). If $T_1 \neq T_2$, step 2420 determines which of the two time interval, $T_1$ and $T_2$, is of a smaller value.

In FIG. 24, the symbol "⇔" denotes a matching process, the underscore denotes "modulo m", and $\kappa$ is the number of the cumulative allocable time slots resulting from matching processes.

If $T_1$ is less than $T_2$, a second-order time-slot matching process is performed at step 2422 between switch units ($\underline{p+T_1}$, $\underline{q+T_1}$) and (u, v) to determine a number $\kappa$, $0 \leq \kappa \leq v$, of matching (allocable) time slots. If $T_2$ is less than $T_1$, a second-order time-slot-matching process is implemented at step 2424 between switch units ($\underline{p+T_2}$, $\underline{q+T_2}$), and (u, v) to determine a number $\kappa$, $0 \leq \kappa \leq v$, of matching (allocable) time slots. The selection of the earlier time interval tends to increase the magnitude of occupancy gradient. If at step 2422 the number $\kappa$ of allocable time slots is less than the required number v, as determined in step 2426, then a second-order time-slot matching process between switch units ($\underline{p+T_2}$, $\underline{q+T_2}$), and (u, v) is performed in step 2430 which returns a total number $\kappa$ of allocable time slots in the second-order matching process of steps 2422 and 2430. Likewise, if step 2424 produces a number $\kappa$ of matching time slots that is less than the required number v, step 2428 directs the scheduling process to step 2432 where a second-order time-slot matching process is executed between switch units ($\underline{p+T_1}$, $\underline{q+T_1}$) and (u, v) to determine a total number $\kappa$ of allocable time slots in the second-order matching process of steps 2424 and 2432. Steps 2422, 2424, 2430, and 2432 also return identifiers of any allocable time slots. If it is determined at any of steps 2426, 2428, or 2334 that the number $\kappa$ of matching time slots equals the required number v, the scheduling process is terminated and identifiers of the $\kappa$ matching time slots are sent to a respective array controller (step 2490). If at step 2434 it is determined that $\kappa < v$, a third-order time-slot matching process would be required and step 2480 is executed during consecutive time intervals starting from time-interval 0 but excluding of course the time intervals during which a second-order time-slot-matching process has already been performed. Thus, at step 2436, the first time-interval $\tau = 0$, is selected. Step 2440 bypasses the third-order time-slot-matching process of step 2480 if the time interval $\tau$ has already been considered for lower-order matching. Otherwise, step 2480 is executed for the current time-interval $\tau$, after which the total number $\kappa$ of allocable time slots is compared with the required number v in step 2450 and a subsequent time interval ($\tau+1$), below the limit m, is considered (steps 2442, 2444).

Figure 25:
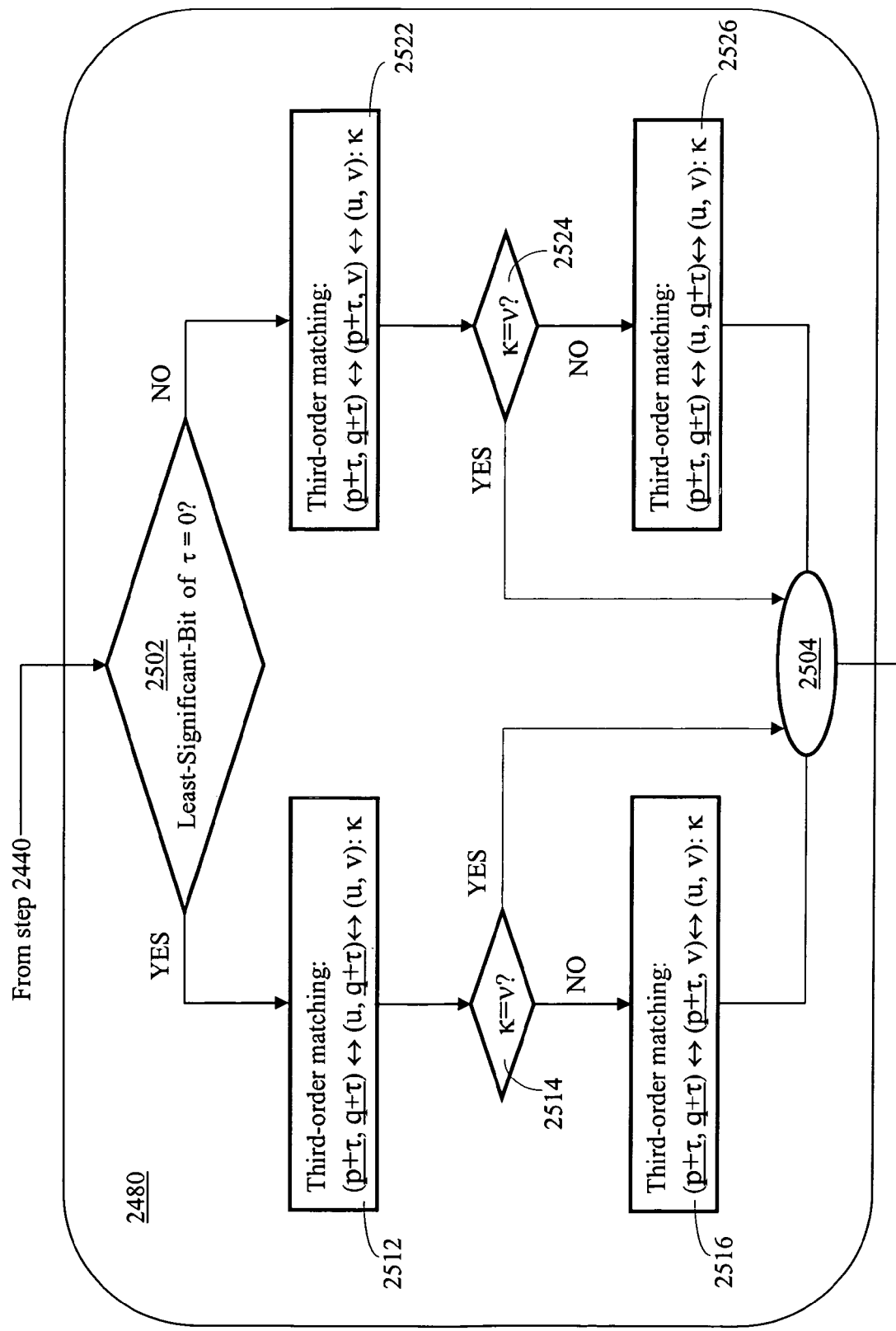
FIG. 25 details a third-order matching process that is part of the connection scheduling process of FIG. 24.

FIG. 25 details a third-order matching process executed in step 2480 of FIG. 24. During any time interval, an incoming channel may have a first-order path, one second-order path, or two third-order paths to any specified outgoing channel. To induce a high temporal-occupancy gradient, the time-slot matching process starts at time interval $\tau = 0$ and proceeds to time interval $\tau = m-1$. As described earlier, it is also desirable to achieve spatial equalization. During successive time intervals, (recall that a time interval includes a number of time slots), the search for matching time slots may alternate between the two third-order paths which start along different directions. Thus, in step 2502, if the time interval $\tau$ is represented by an even number (hence, the least-significant-bit in its binary representation is zero), the search for matching time slots starts in one direction and if the time interval $\tau$ is represented by an odd number, the search starts in the other direction. In either case, if the matching process during an interval $\tau$ along one of the third-order paths does not produce the required number of allocable time slots, the search continues along the other third-order path.

A first third-order path from an incoming channel labeled (p, q, x), where x denotes any outer input port of a switch unit, and (p, q) are coordinates of the initial switch unit accessed by the incoming channel during time interval $\tau = 0$, to an outgoing channel permanently connecting to switch unit labeled (u, v) requires a third-order time-slot-matching process expressed as:

$$(\underline{p+\tau}, \underline{q+\tau}) \Leftrightarrow (u, \underline{q+\tau}) \Leftrightarrow (u, v): \kappa,$$

where the symbol "⇔" denotes a matching process, the underscore denotes "modulo m", and $\kappa$ is the number of the cumulative allocable time slots, which includes time slots allocated up to step 2434 of FIG. 24. In the above expression, (p+$\tau$, $\underline{q+\tau}$) defines the switch unit to which the incoming channel connects during time interval $\tau$, and (u, $\underline{q+\tau}$) defines a switch unit "vertically" aligned with the target switch unit (u, v) during time interval $\tau$.

The second third-order path traverses an intermediate switch unit ($\underline{p+\tau}$, v), which is "horizontally" aligned with the target switch unit (u, v), and the corresponding third-order time-slot-matching process is expressed as:

$$(\underline{p+\tau}, \underline{q+\tau}) \Leftrightarrow (\underline{p+\tau}, v) \Leftrightarrow (u, v): \kappa.$$

If the time interval $\tau$ is represented by an even number, the first third-order path is selected (step 2512) and if the number $\kappa$ of allocable time slots is less than the specified number v, the second third-order path is selected (step 2516). Otherwise, if the time interval $\tau$ is represented by an odd number, the second third-order path is selected (step 2522) and if the number $\kappa$ of allocable time slots is less than the specified number v, the first third-order path is selected (step 2516).

Conjugate Architecture

The various aspects of architecture and control as described with reference to the base architecture of FIG. 9 can be adapted to suit the conjugate arrangement of FIG. 11. The invention, therefore, provides a high-capacity time-shared switch having a bufferless core comprising low-latency optical switch units. The structure of the switch is simpler and easier to control in comparison with prior-art designs. Although the illustrated embodiments relate to a bufferless switch in which a plurality of balanced connector precede the switch fabric, as illustrated in FIG. 9, similar benefits can be realized with balanced connectors succeeding the switch fabric.

In view of the description above, it will be understood by those of ordinary skill in the art that modifications and variations of the described and illustrated embodiments may be made within the scope of the inventive concepts. For example, although the disclosure has described the use of the inventive architecture within an optical buffer-less core framework, it is envisioned that the concepts of the invention may also advantageously be implemented in electrical or hybrid optical/electrical cores, and thus the present invention is not limited to use in any particular signaling technology. Moreover, while the invention is described in connection with various illustrative structures, those of ordinary skill in the art will recognize that the invention may be employed with other structures. Accordingly, the invention should not be viewed as limited except by the scope and spirit of the appended claims.

What is claimed is:

1. A switch comprising:
   a plurality of switch units arranged in a lattice structure of row arrays of switch units and column arrays of switch units wherein switch units of each said row array are interconnected to form a full row mesh and switch units of each said column array are interconnected to form a full column mesh;
   a plurality of channels;
   a plurality of balanced connectors each balanced connector connecting to a subset of said switch units having non-intersecting coordinates, where coordinates of each switch unit are derived from a row array and a column array to which said each switch unit belongs; and
   wherein each balanced connector cyclically connects a subset of channels from among said plurality of channels exclusively to the subset of said switch units connected to said balanced connector during successive time intervals of a time frame.

2. The switch of claim 1 further including a plurality of edge nodes, each edge node having a channel to one of said balanced connectors and a channel from one of said switch units.

3. The switch of claim 1 wherein at least one of said switch units comprises a bufferless switch fabric.

4. The switch of claim 1 wherein said at least one of said switch units has an optical switch fabric.

5. The switch of claim 1 wherein said each balanced connector comprises a plurality of rotator units having graduated rotation shifts, so that the rotation shift of each rotator unit is larger than the rotation shift of a preceding rotator unit.

6. The switch of claim 1 wherein any two switch units in said subset of said switch units belong to different row arrays and different column arrays.

7. The switch of claim 1 further including a plurality of edge nodes each having a channel from one of said balanced connectors and a channel to one of said switch units.

8. The switch of claim 1 further comprising:
   a plurality of array controllers each array controller associated with one of said row arrays and coupled to a slave controller of each switch unit in said one of said row arrays; and
   a master controller coupled to each of said array controllers.

9. The switch of claim 8 wherein said array controllers are associated with a group of host switch units selected from among said plurality of switch units so that:
   each host switch unit supports only one array controller; and
   the host switch units have non-intersecting coordinates, where coordinates of any switch unit are derived from the row array and column array to which said any switch unit belongs.

10. The switch of claim 8 further comprising a scheduler associated with said master controller, said scheduler operable to:
    receive connection requests each connection request specifying an incoming channel, an outgoing channel, and a specified number of time slots in a time-slotted frame; and
    perform a vacancy-matching process to find a free path for each of said specified number of time slots for said each connection request.

11. The switch of claim 8 further comprising a time counter coupled to each of said array controllers, said time counter providing a reference time for time-locking external nodes to said plurality of switch units.

12. An asymmetrical switch comprising:
    a plurality of input ports;
    a plurality of output ports
    a switching fabric for connecting each of said input ports to at least one of said output ports;
    and
    a plurality of balanced connectors each balanced connector for cyclically connecting a subset of ingress channels from among a plurality of ingress channels exclusively to a subset of input ports from among said plurality of input ports during successive time intervals of a time frame;
    wherein said switching fabric comprises a plurality of switch units arranged in row arrays of switch units interconnected to form a full row mesh and column arrays of switch units interconnected to form a full column mesh; and
    wherein said subset of input ports comprises one input port of each switch unit of a diagonal set of switch units, where any two switch units of a diagonal set of switch units belong to different rows and different columns.

13. The asymmetrical switch of claim 12 wherein said each a balanced connector equitably connects each ingress channel of said subset of ingress channels to each input port of said subset of input ports during said time frame.

14. The asymmetrical switch of claim 12 wherein said each balanced connector comprises a plurality of rotator units having graduated rotation shifts selected so that during said time frame, any combination of two ingress channels from among said plurality of ingress channels connects only once to input ports of a same switch unit of said diagonal set of switch units.

15. The switching system of claim 12 wherein said switching fabric comprises optical switch units interconnected in a second-order mesh structure so that each of said input ports has multiple paths to each of said output ports.

16. The switching system of claim 12 wherein said switch fabric is time-multiplexed over a repetitive time frame.

17. The switching system of claim 16 further comprising a master controller for selecting at least one path and at least one time slot in said repetitive time frame to transfer a signal from each said ingress channel to at least one of said output ports.

* * * * *

UNITED STATES PATENT AND TRADEMARK OFFICE
CERTIFICATE OF CORRECTION

PATENT NO. : 7,590,110 B2
APPLICATION NO. : 11/315715
DATED : September 15, 2009
INVENTOR(S) : Beshai et al.

It is certified that error appears in the above-identified patent and that said Letters Patent is hereby corrected as shown below:

At column 20, line 36, after a plurality of outputs ports add :

At column 20, line 57, delete "a" before balanced connector ...

Signed and Sealed this

Tenth Day of August, 2010

David J. Kappos
*Director of the United States Patent and Trademark Office*

UNITED STATES PATENT AND TRADEMARK OFFICE
CERTIFICATE OF CORRECTION

PATENT NO. : 7,590,110 B2  Page 1 of 1
APPLICATION NO. : 11/315715
DATED : September 15, 2009
INVENTOR(S) : Beshai et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 859 days.

Signed and Sealed this

Twenty-first Day of September, 2010

David J. Kappos
*Director of the United States Patent and Trademark Office*